United States Patent [19]
Gebizlioglu et al.

[11] Patent Number: 5,115,028
[45] Date of Patent: May 19, 1992

[54] TOUGH POLYMER COMPOSITIONS

[75] Inventors: Osman S. Gebizlioglu, Hazlet, N.J.; Robert E. Cohen, Jamaica Plain, Mass.; Ali S. Argon, Belmont, Mass.; Haskell W. Beckham, Cambridge, Mass.; Jian Qin, Medford, Mass.

[73] Assignee: Massachusetts Institute of Technology, Cambridge, Mass.

[21] Appl. No.: 473,261

[22] Filed: Jan. 31, 1990

Related U.S. Application Data

[63] Continuation-in-part of Ser. No. 48,179, May 11, 1987, abandoned.

[51] Int. Cl.⁵ .................... C08L 9/00; C08L 25/04
[52] U.S. Cl. ........................... 525/232; 525/237; 525/241
[58] Field of Search ..................... 525/232, 241

[56] References Cited

U.S. PATENT DOCUMENTS 4,594,391  6/1986  Jones .................... 525/316

OTHER PUBLICATIONS

Advanced Polymer Science 91/92, pp. 301-351 Argon et al.
Macromolecules 1989, 22, pp. 1002-1004.

*Primary Examiner*—Jacob Ziegler
*Attorney, Agent, or Firm*—Paul J. Cook

[57] ABSTRACT

Polymer blends are provided comprising a glassy thermoplastic polymer having a glass transition temperature above ambient conditions, e.g., normal room temperature and between 0.1 and 4.0 weight percent of a rubbery polymer having a glass transition temperature below ambient temperature conditions, e.g., normal room temperature based on the weight of the blend. The blends can be produced by solution casting or by coagulation from solution followed by flocculation.

6 Claims, 34 Drawing Sheets

FIG. 9  10% ABS + 3% PB

FIG. 16A: UNDEFORMED FILM

FIG. 16B: DEFORMED FILM

FIG. 18: TEM micrograph of the acrylonitrite-butadiene-styrene compression moulded film

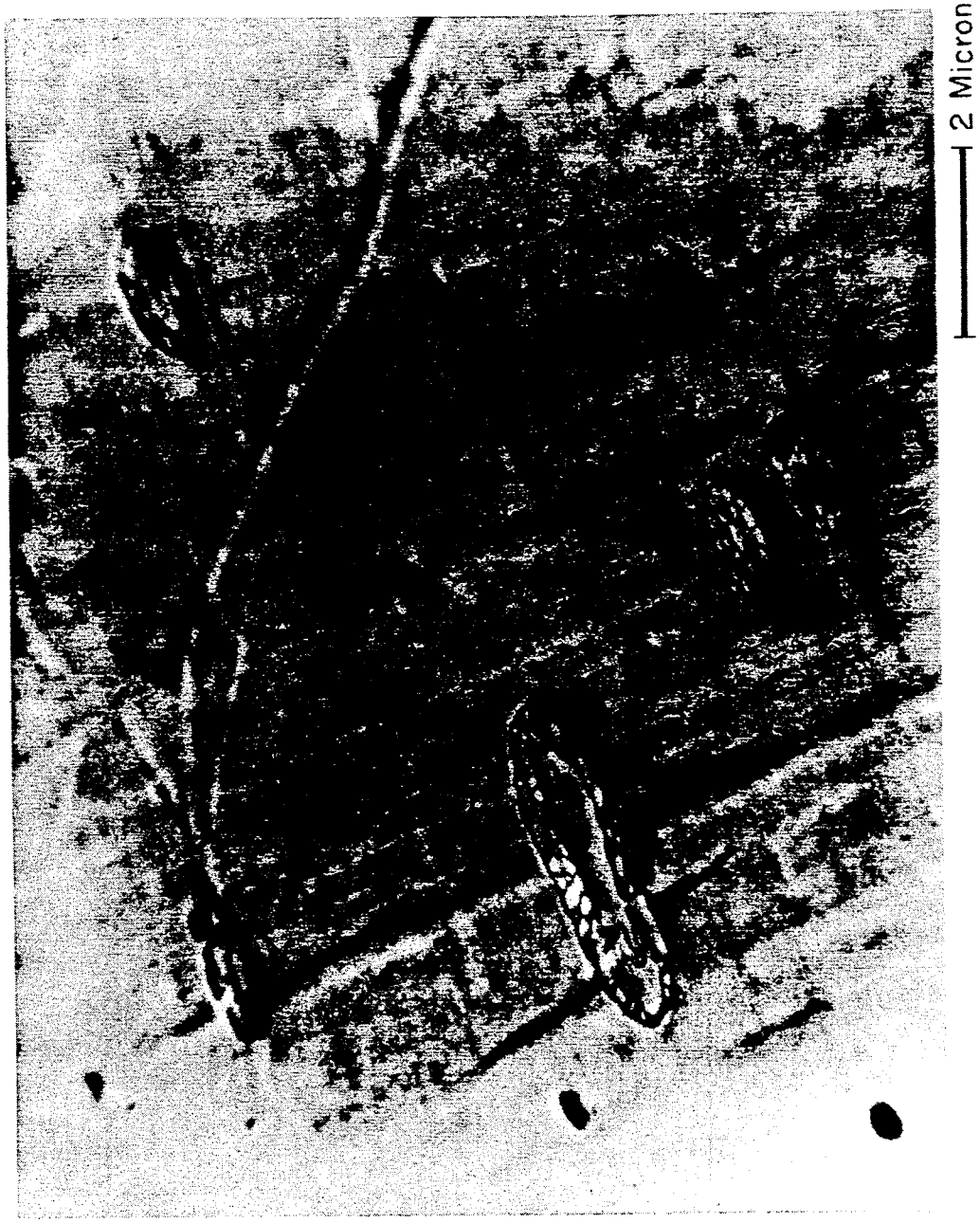
FIG. 20A: PS/5% ABS

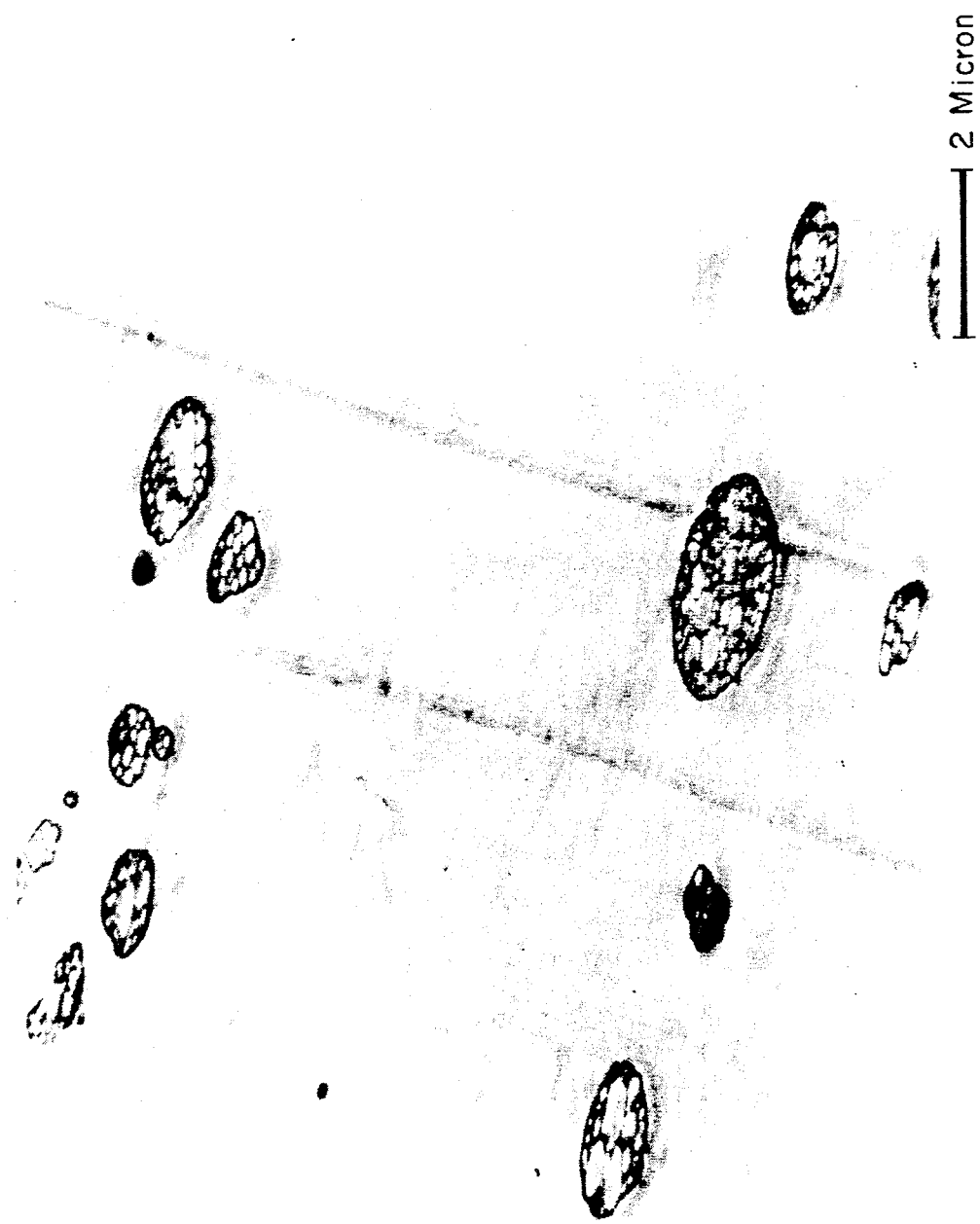
FIG. 20B: PS/10% ABS

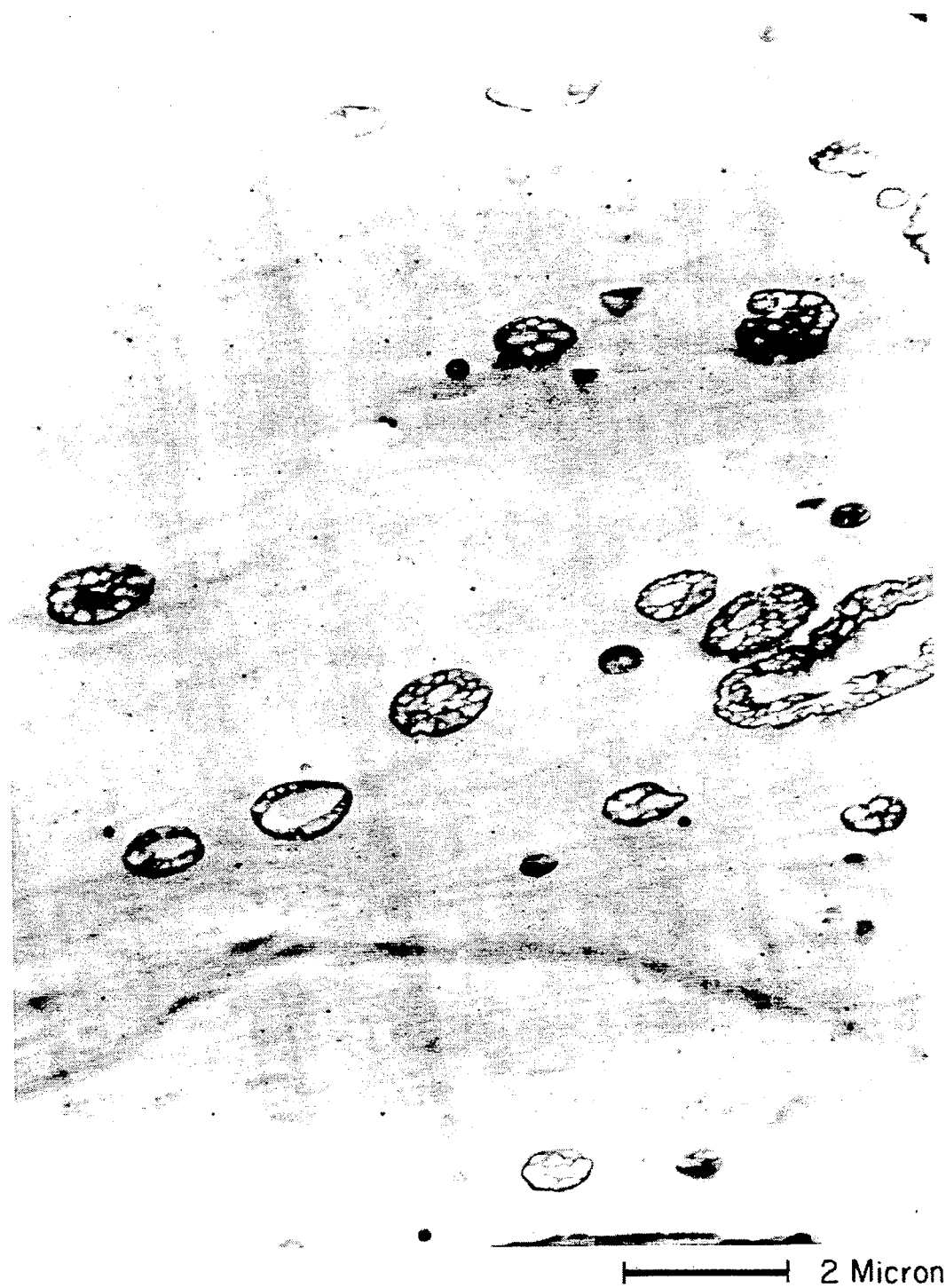
FIG. 20C: PS/20% ABS

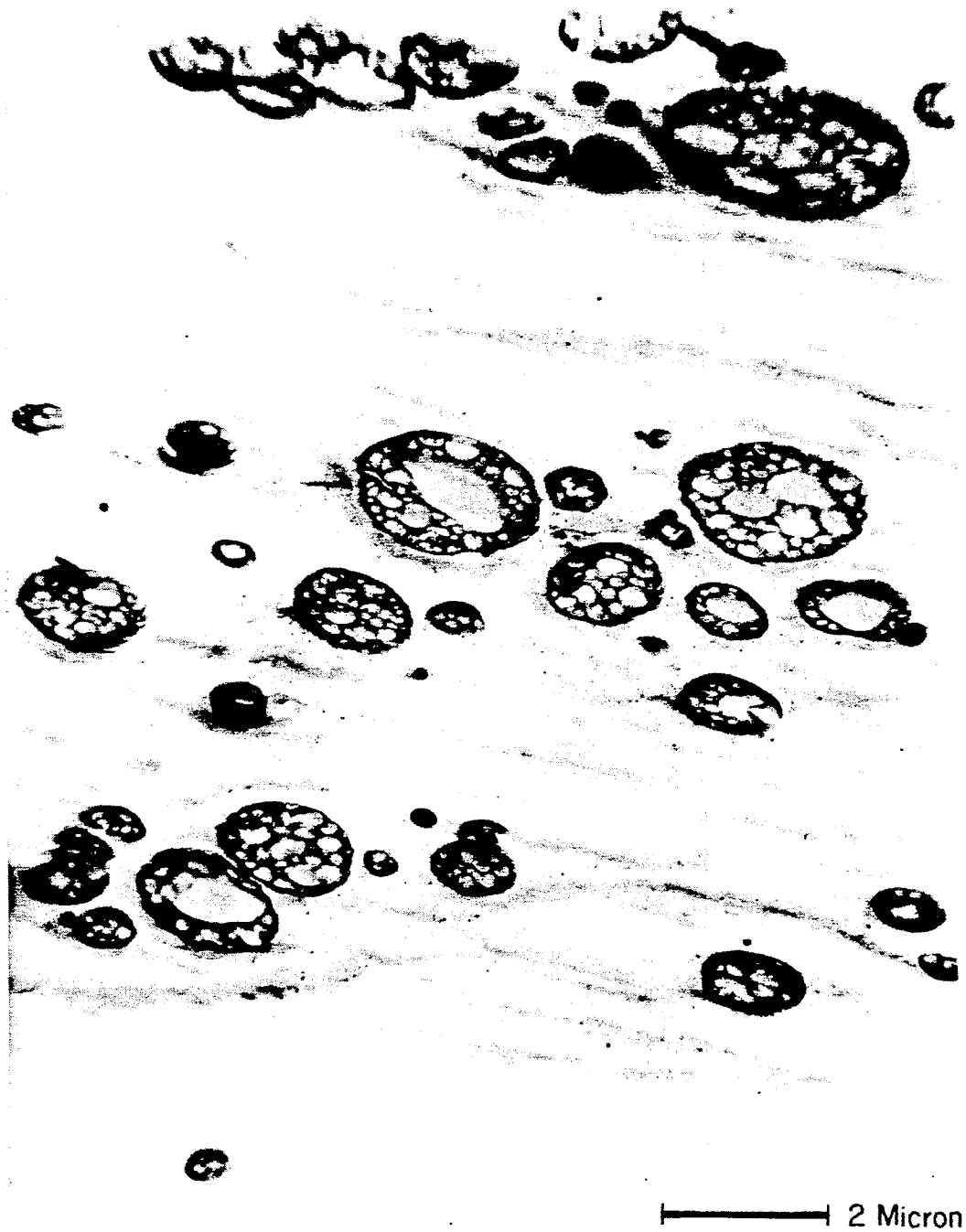
FIG. 20D: PS/30% ABS

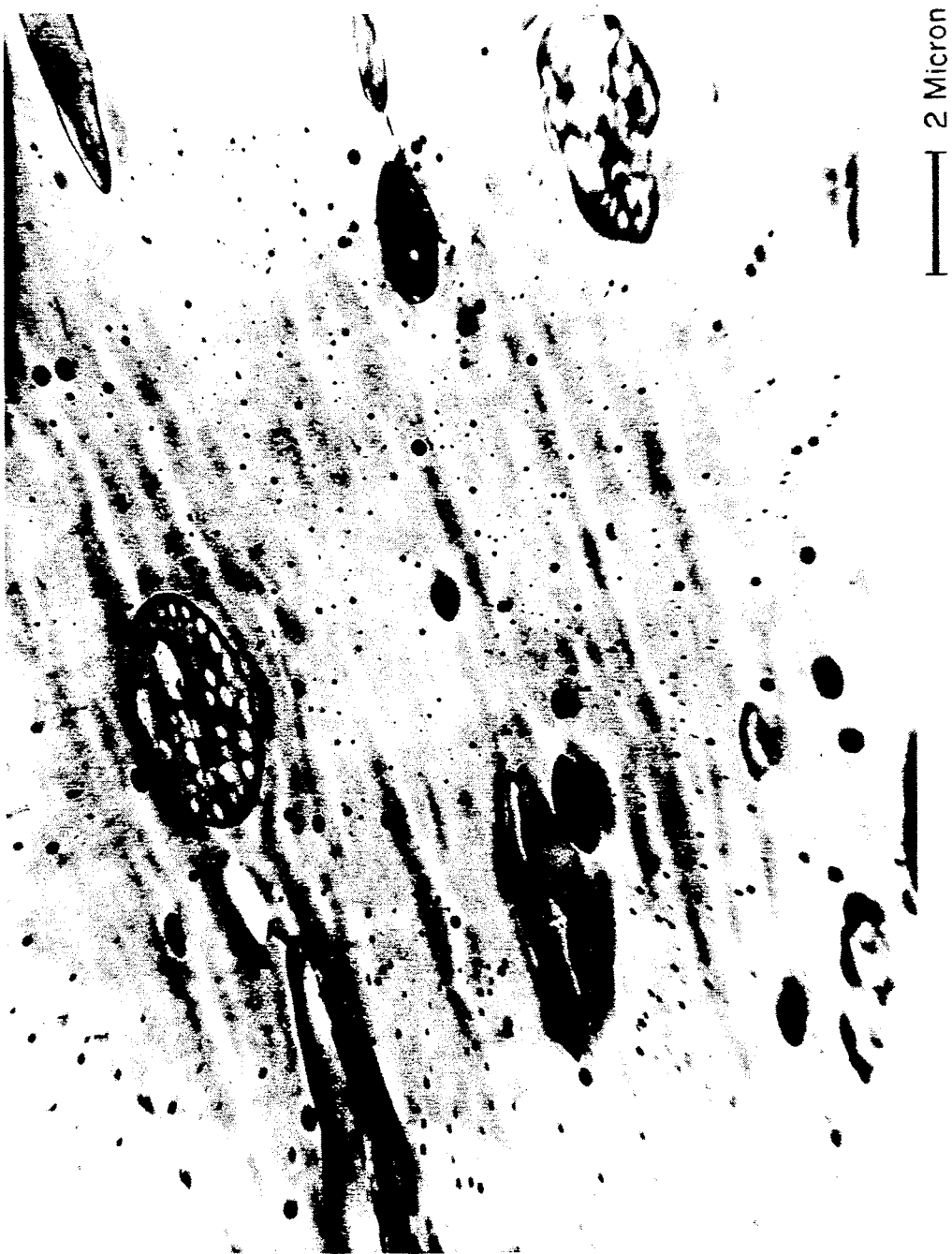
FIG. 21A: PS/5% ABS/3% PB-3400 Mn

FIG. 21B: PS/7% ABS/3% PB-3400 Mn

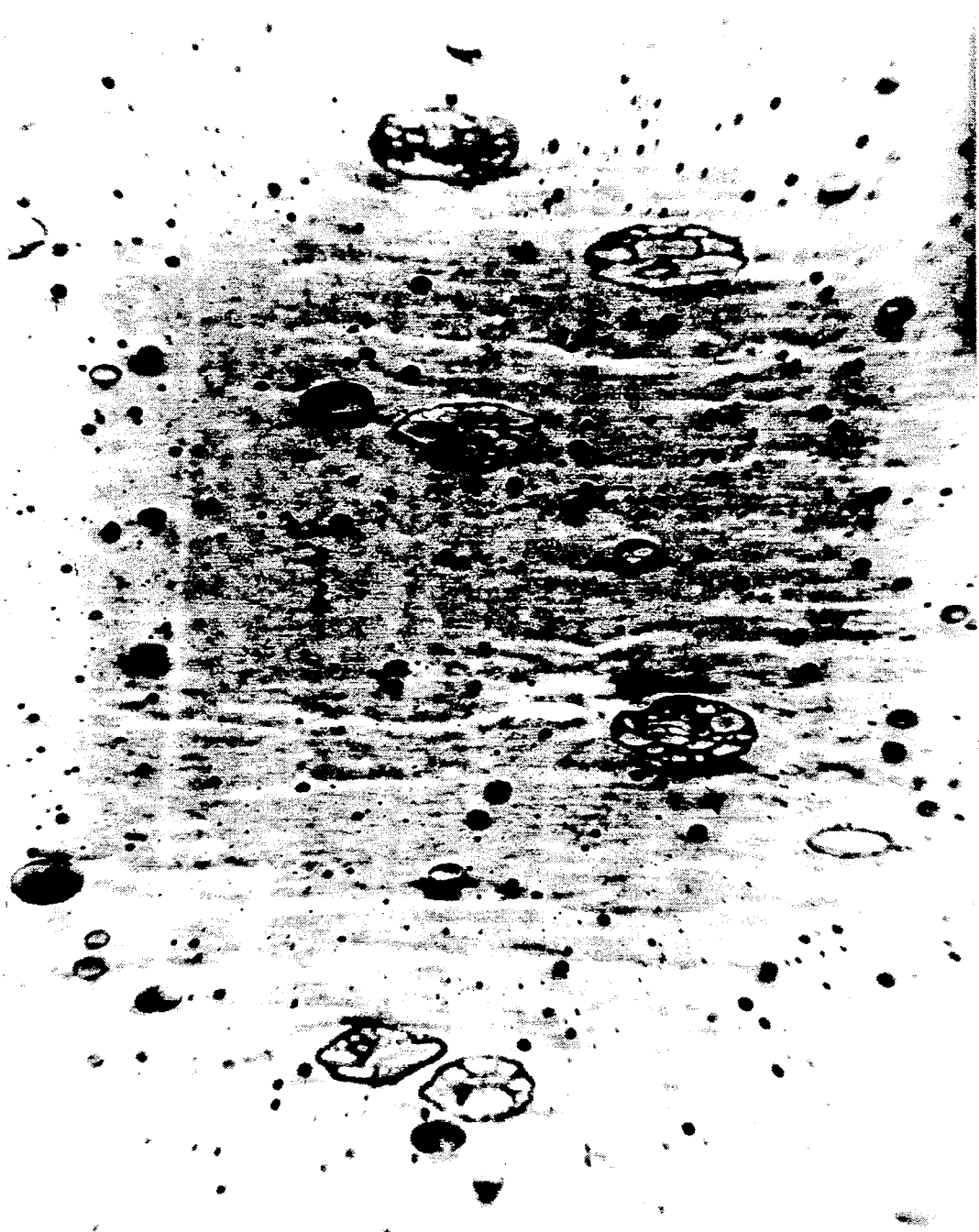
FIG. 21C: PS/10% ABS/3% PB-3400Mn

FIG. 21D: PS/20% ABS/3% PB-3400 Mn

FIG. 25A: PS/5% ABS/3% PB-3400 Mn

FIG. 25B: PS/7% ABS/3% PB-3400

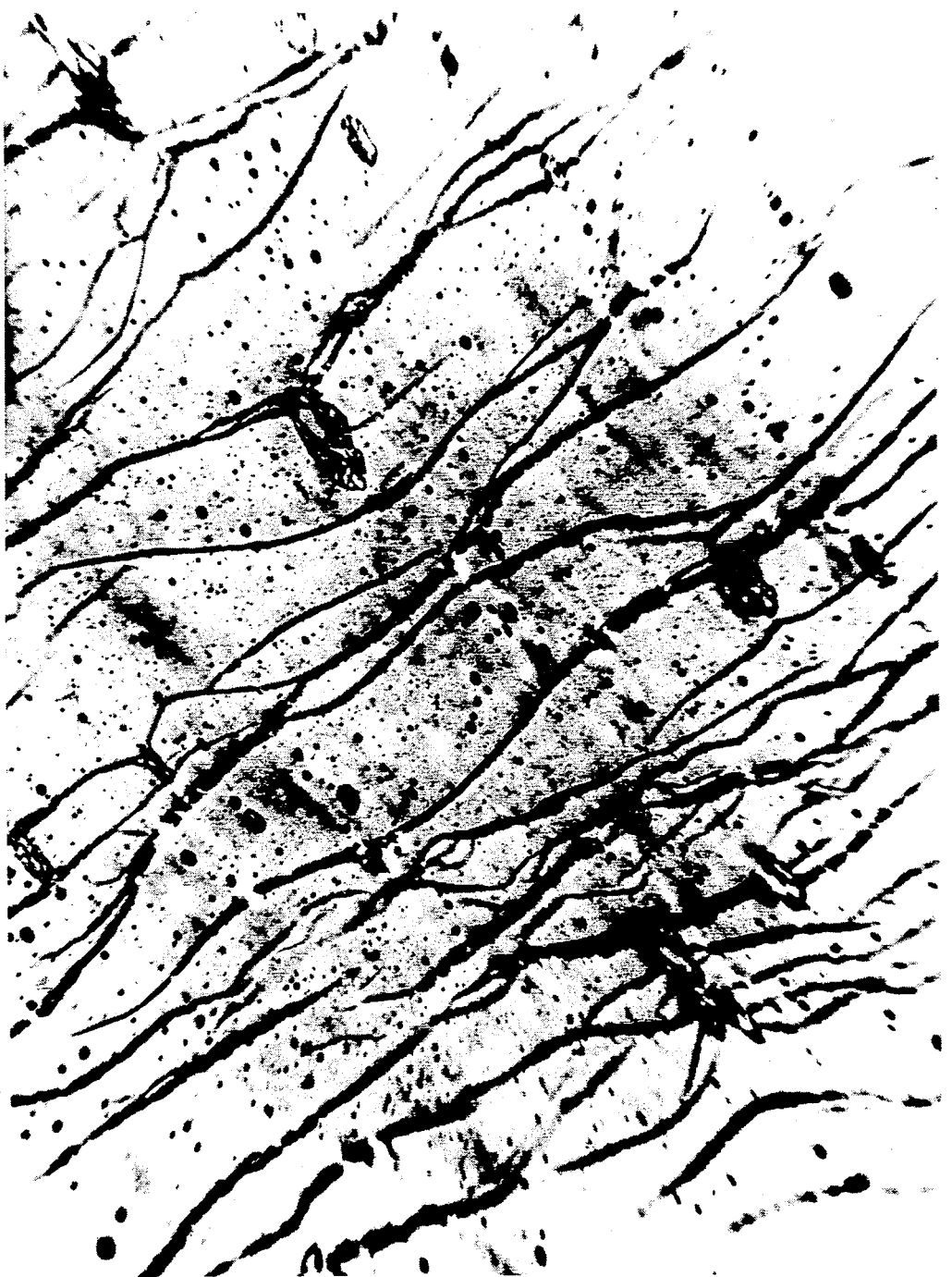
FIG. 25C: PS/10% ABS/3% PB-3400 Mn

FIG. 25D: PS/20% ABS/3% PB-3400Mn

TENSILE DEFORMATION MECHANISMS OF PS, PS/PB, ABS AND PS/ABS/PB COMPRESSION-MOULDED FILMS

TOUGH POLYMER COMPOSITIONS

The Government has rights in this invention pursuant to grant Number DMR8119295 awarded by the National Science Foundation.

REFERENCE TO RELATED APPLICATION

This application is a continuation in part of copending application Ser. No. 048,179, filed May 11, 1987 now abandoned.

BACKGROUND OF THE INVENTION

This invention relates to novel polymer blends formed from a rubbery polymer and a major proportion of a glassy thermoplastic polymer such as polystyrene (PS), poly-methylstyrene, polypara-methylstyrene, polymethylmethacrylate, (PMMA), polyvinylchloride, polyethyleneterephthalate, poly(styrene-co-acrylonitrile), poly (styrene-co-methyl methacrylate), polycarbonates and the like.

Prior to the present invention, glassy polymers have been prepared and used in the production of articles formed by molding such as compression molding or injection molding. It is also known to incorporate into glassy polymers a rubbery polymer in order to improve the impact strength of the resultant material. Typically, the polymer components of the blend are mechanically worked together by heated compound rolls and the like. Alternatively, coagulated emulsion latices of the glassy polymer and the rubbery polymer are mixed together to form resultant polymer blends. Complex phase inversion graft copolymerizations are also employed. These polymers contain between about 5 and about 45 weight percent of the rubbery polymer with the remainder being the polymer formed from the glassy compound. Such polymers are disclosed for example in U.S. Pat. No. 3,090,767 and U.S. Pat. No. 3,458,602. While these blends have improved toughness as compared to the pure glassy polymer, it would be desirable to improve the impact strength and toughness of this class of polymer in order to expand the environments within which they can be utilized satisfactorily, particularly in environments where articles produced from the blends are subjected to stress and strain forces. In addition, presently available polymer blends are formed by a process comprising the steps of bulk and emulsion polymerization. This process is time consuming and expensive.

Many atactic flexible chain glassy polymers such as polystyrene, PMMA and their various modifications which have very attractive properties of stiffness and appearance, and are relatively easily processed into finished products, however, suffer from brittleness in unoriented form. While moderate levels of uni-axial or bi-axial orientation can rectify this imbalance, both types of orientation processing limit the range of shapes that can be manufactured and restrict the applicability of manufacturing process such as injection molding.

Alternative approaches to the alleviation of this brittleness problem have included blending with other less flexible chain homopolymers that are known to undergo plastic flow in tension rather than exhibit crazing. The most widely preferred chain polymers, however, is rubber modification by incorporation of a substantial volume fraction (typically 0.1) of an elastomeric component in the form of block or graft polymer. The elastomer undergoes phase separation, while maintaining a high quality interface between the homopolymer and the precipitated compliant particle phase.

The inelastic strain in flexible chain glassy homopolymers deformed in tension is produced by the dilational plasticity of crazes, initiated from surface imperfections, and the brittleness results from the premature fracture of such crazes when the latter, during their growth, encounter inorganic particulate impurities. Thus, the root cause of the brittleness in question is the fracture of craze matter, initiated from the supercritical flaws that result when a growing craze encounters a poorly adhering inorganic dust particle, typically of micron dimensions. This undesirable response has a number of important ingredients. The surface imperfections on the average have a relatively low potency to initiate crazes. They can provide, at best, plastic response only in a surface layer. For additional plastic extension the crazes must spread under the prevailing tensile stress into the elastic interior regions of the stressed part at rates governed by the kinetics of craze matter production at the borders between the initiated crazes and the solid homopolymer. The combination of the low volume density of surface initiated crazes and their growth kinetics is such that the rates of deformation imposed by a testing machine or an impact require a high tensile stress acting across the crazes to match the dilational craze strain rate against the imposed rates. Finally, the fracture toughness of craze matter is insufficient to cope with the flaws introduced by the micron size poorly adhering inorganic dust particles present in the solid polymer, when these particles become incorporated into a growing craze. The elimination of the dust particles which initiate the final craze fracture is impractical and is, at best, only marginally effective. Thus, not withstanding the many explanations found in the literature, the principle reason for the effectiveness of high impact polymerstyrene (HIPS) of acrylonitrile-butadiene-styrene (ABS) polymers in toughening, is the substantial lowering of the craze flow stresses (by more than a factor of two) that results from the heterogenous rubbery particles which they contain. The principle function of these particles of adequate compliance and size is to initiate a much larger density of active crazes throughout the volume of the solid polymer than what can be generated from surface imperfections. Within the restriction of the normal craze growth kinetics this then permits the matching of the plastic craze strain rate to the imposed deformation rates under a considerably lower tensile stress for which the flaws due to most the usual dust particles now become sub-critical and the polymer survives long enough to undergo substantially larger strains to fracture.

Therefore; it would be desirable to produce polymer blends which retain the stiffness of the glassy component while exhibiting substantially reduced craze growth stresses, thereby increasing toughness substantially. It would also be desirable to provide a process for preparing polymer blends which reduces the number of process steps required for producing the blend.

DESCRIPTION OF SPECIFIC EMBODIMENTS

In accordance with this invention, a glassy thermoplastic polymer is intimately admixed to form a blend with a low molecular weight rubbery polymer having a molecular weight of between about 2.0 and about 5.0 Kg/mole at a concentration of between about 0.1 and 4 wt. percent based upon the weight of the blend. When the structure of the blend is viewed microscopically small pools of the low molecular weight rubbery polymer are substantially uniformly distributed throughout the glass polymer matrix. The pools are formed as a result of the insolubility of the low molecmolecular weight rubbery polymer in the glassy polymer. The small rubbery polymer pools have a size between about 100 and 2000 Angstrom in diameter. Surprisingly, it has been found that when the pools of rubbery polymer are larger than about 2000 Angstroms, the toughness of the resultant blend is substantially reduced.

The rubbery polymer comprises polymers or copolymers obtained from diolefin compounds such as butadiene-1,3; isoprene; 2,3-dimethyl butadiene-1,3; 1,4-dimethylbutadiene-1,3; piperylene; heptadiene-1,3; 2-methyl pentadiene-1,5; 2-methyl-3-butadiene-1,3; 2,3-diethylbutadiene; and other random copolymers such as styrene-butadiene; saturated hydrocarbon rubbers such as polybutene-1, polyisobutylene, polypentenamer, or the like, rubbers and block copolymers. Typically the rubbery polymer has a molecular weight between about 2 and 5 Kg/mole. It is important that the rubber be insoluble at ordinary pressures in the glassy host matrix material and have low viscosity (fluid-like material) at conditions of use. Thus materials commonly considered to be thick "oils" may also be used in the place of the rubbery polymers set forth above such as silicone oils or the like.

The relatively hard thermoplastic resin component of the composition of this invention comprises a polymer produced from monomers such that the resulting soluble thermoplastic polymer has a glass transition temperature greater than ambient room temperature or application conditions. Representative vinyl aromatic monomers includes styrene, ortho, meta or para-methyl styrene, dimethyl styrene, ethyl vinyl benzene, diethylvinyl benzene, methyl methacrylate, high impact polystyrene, mixtures of styrene and methyl methacrylate, mixtures of styrene and acrylonitrile, vinyl chloride, also, non-pure hydrocarbons, i.e., polymethylacrylates and other rubbery acrylate and methacrylate rubbers or polysilicones, e.g., polydimethyl siloxane, ethyleneterephthalate, monomers of polycarbonates, mixtures of polystyrene and about 10% acrylonitrile, butadiene styrene (ABS) terpolymer or mixtures thereof can be utilized.

The concentration of the rubbery elastomer is between about 0.1 to about 4 weight percent based upon the total weight of the polymer blend. A preferred concentration range of rubbery polymer is between about 0.5 percent and about 1.0 weight percent. In any event, the size of the pools of rubbery polymer must be between about 100 and 2000 Angstroms.

In another aspect of the present invention, it has been found that the inclusion of a third component comprising a low molecular weight fraction of the glassy polymer as defined above, though not essential, improves the toughness of the resultant polymer blend. The amount of the low molecular weight glassy polymer should be between about 0.1 and about 1.2 weight percent, preferably between about 0.5 and about 1.2 weight percent based upon the weight of the polymer blend. The low molecular weight of glassy polymer has a molecular weight less than about 3000 Kg/mole, usually between about 1000 and 3000 Kg/mole.

The polymer blends of this invention are characterized by high toughness at least as high as commercially available polymer blends based upon a polymer of a monovinyl aromatic monomer and a diolefin polymer. In addition, some of the polymer blends of this invention are characterized by unusual optical characteristics in that they are transparent or translucent while presently available high impact polymer blends are optically opaque. When viewed by transmission electron microscopy, the polymer blends of this invention containing 0.4 to 4 weight % of the rubbery elastomer are characterized by a two phase morphology of liquid rubber pools of a size less than 2000 Angstroms in the glassy component.

The polymer blends of this invention can be prepared by dissolving the polymer components in a suitable solvent and then casting the resulting blend into the desired shape. The solvent then is removed from the blend in order to produce a final solid polymer blend. Representative suitable solvents which can be employed include toluene, benzene or mixtures thereof. Solvent removal can be effected in any conventional manner such as by utilizing an elevated temperature between about 40° C. and about 100° C. and maintaining a dry atmosphere contigueous to the blend solution in order to effect solvent evaporation into the adjacent atmosphere. Alternatively, the solution of polymer can be coagulated by admixture with a second insolvent, i.e., a fluid in which the polymer components are insoluble, followed by floculation of the coagulated polymer. The dried flocculated powder may then be molded into desired shape.

DESCRIPTION OF SPECIFIC EMBODIMENTS

The remaining drawings describe polymeric morphology and physical properties.

Figure 9:
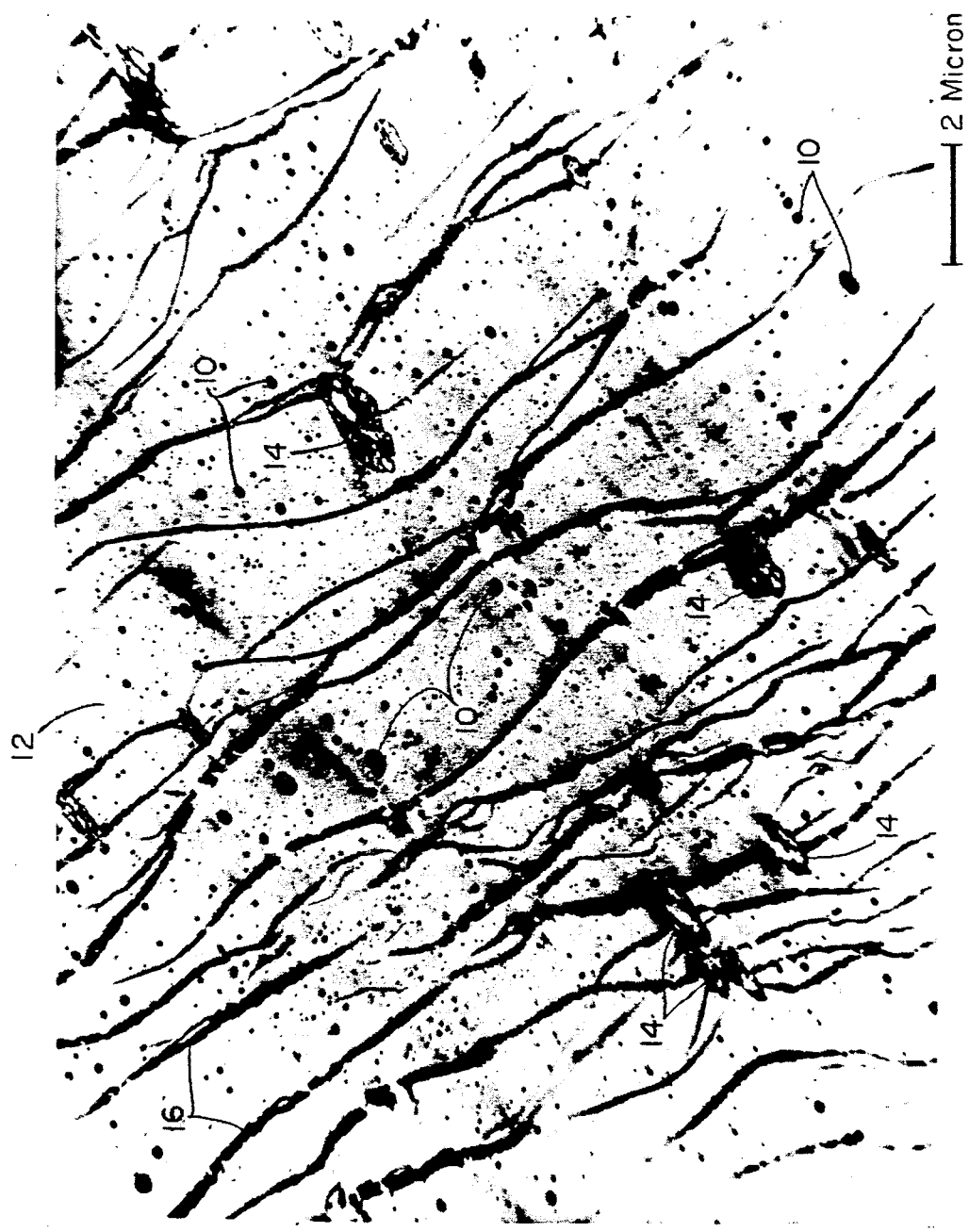
FIG. 9 is a photomicrograph of glassy polystyrene containing 10ABS and 3% rubbery polybutadiene.

As shown in FIG. 9, the rubbery polybutadiene (PB) (3% by weight), 10 is relatively uniformly interspersed within the glassy polystyrene polymer substrate 12 containing ABS (10% by weight) 14 comprising the larger particles. The crazes shown in the figure interact strongly into small PB pools and thus provide a means for local plasticization. These crazes which are the principal source of plastic shear have been formed at a stress of about 20 MPa and have resulted in about 60% strain prior to fracture.

The following examples illustrate the present invention and is not intended to limit the same.

Low molecular weight polybutadiene (PB 2.76K) is an anionic solution polymer available from Polyscience, Inc. of Warrington, Pa. Proton NMR measurements show that it is predominantly of 1,4 addition.

Broad molecular weight distribution polystyrene (under the trade name HH-101) is an emulsion polymer obtained from Monsanto Polymer Products Co. of Springfield, Mass. It will be designated herein as PS(HH-101). Narrow molecular weight distribution polystyrene was obtained from Pressure Chemical Company of Pittsburgh, Pa. Table 1 presents the molecular weight characteristics of all the blend components.

TABLE I

| Component | $M_w$, Kg/mole | $M_w$, Kg/mole | $M_w/M_n$ |
| --- | --- | --- | --- |
| PB (2.76K) | 2.76 | — | 1.06 |
| PB (6K) | 6.0 | — | 1.06 |
| PB (23.6K) | 23.76 | — | 1.06 |
| PS (3.6K) | 3.6 | — | 1.08 |
| PS (HH-101) | 268.0 | 112.0 | 2.39 |
| PS (152K) | 152.0 | — | 1.06 |
| PS (300K) | 300.0 | — | 1.06 |

Solution blending and spin-casting were used to prepare films of thickness 0.2–0.7 mm. Weighed quantities of binary and ternary blend components were dissolved in 100.0 ml or reagent grade toluene, which is a good solvent for both polybutadiene and polystyrene. After complete dissolution of 5 gm of polymer, the solution was fed through a Millipore PTFE Filter of 10.0 μm pore size into a spin-cup made of aluminum and spinning at 3600 rpm. The spin-casting was carried out with temperature control and inert atmosphere was maintained by a constant flow of dry, purified nitrogen from a cylinder. At the completion of the spin-casting, films were vacuum annealed at 100° C. for a period of 24 hours.

Morphology of the blends prepared was examined in Philips EM200 and EM300 Transmission Electron Microscopes. A small piece cur from the films was stained in a 1% (be weight) aqueous solution of $OsO_4$. Sections of thickness in the range of 500–900 Angstroms were cut from stained specimens by the use of an LKB Ultrasome III Model 8800, using glass and diamond knives. TEM micrographs do not show any evidence of a separate polybutadiene phase in the polystyrene matrix for blends containing 0.4 wt % polybutadiene or less. For all compositions from 0.5 wt % polybutadiene to 5.0 wt % polybutadiene, blends exhibit a morphology of polybutadiene particles in polystyrene matrix.

In blends containing 1.0 wt % polybutadiene and narrow molecular weight distribution polystyrene, microstructures consist of polybutadiene particles in polystyrene matrix. In all blends, size scale of particles appears to depend on composition. For low compositions where concentric shell structures are observed, particle diameters are approximately 0.2 m–0.3 m and above) with a narrow distribution. However, for higher polybutadiene compositions, large particles of polybutadiene appear and size distribution becomes broader.

All tensile tests were conducted on an Instron Tensile Tester Model 1122 at a strain rate $1.3 \times 10^{-4}$ sec$^{-1}$. Tensile specimens of dogbone shape (gauge length of 6.35 mm (0.25") and width of 3.18 mm) were cut from spincast films. All specimens were conditioned in the standard laboratory atmosphere of 23° C. and 55–60% relative humidity for 24 hours.

Figure 1:
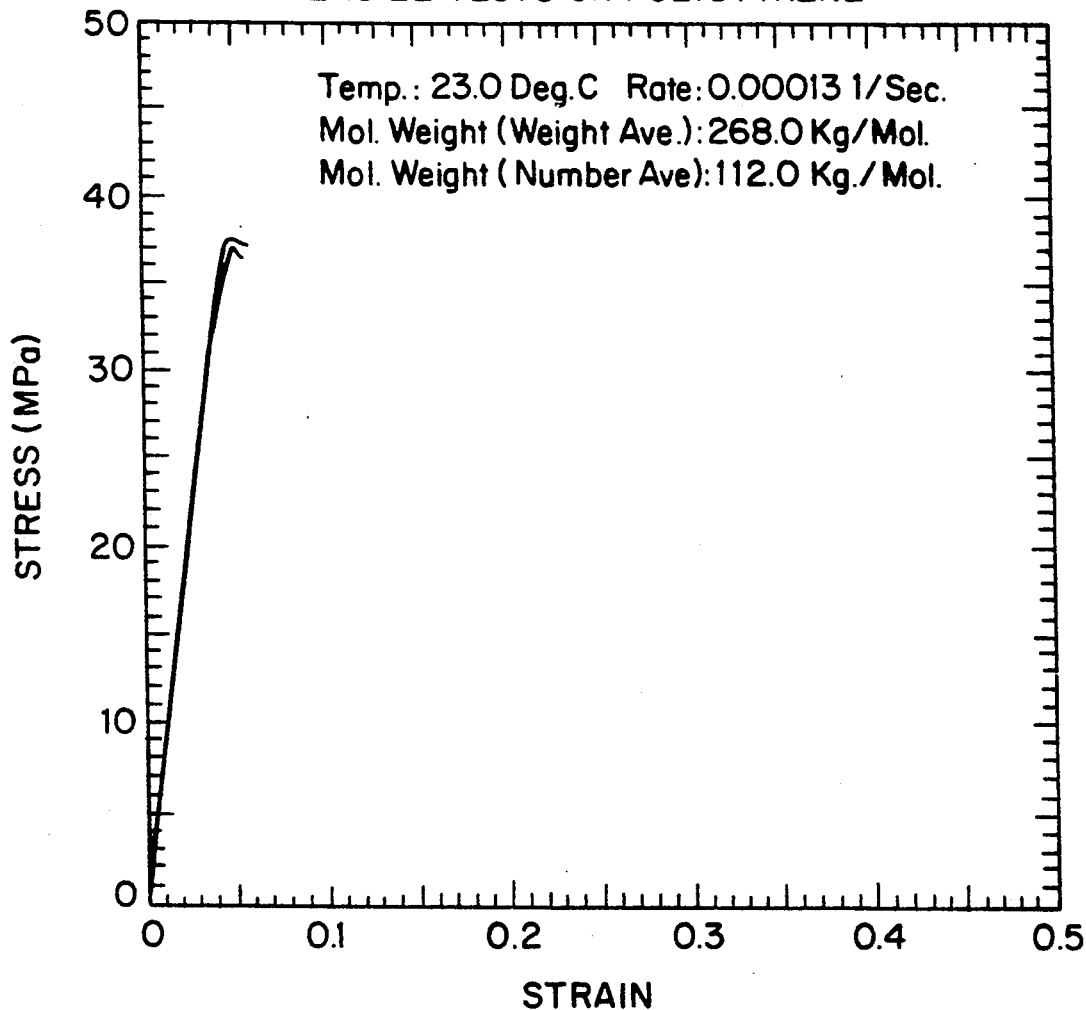
FIG. 1 is the tensile stress-strain curve for broad molecular weight distribution polystyrene, PS (HH-101).
Figure 2:
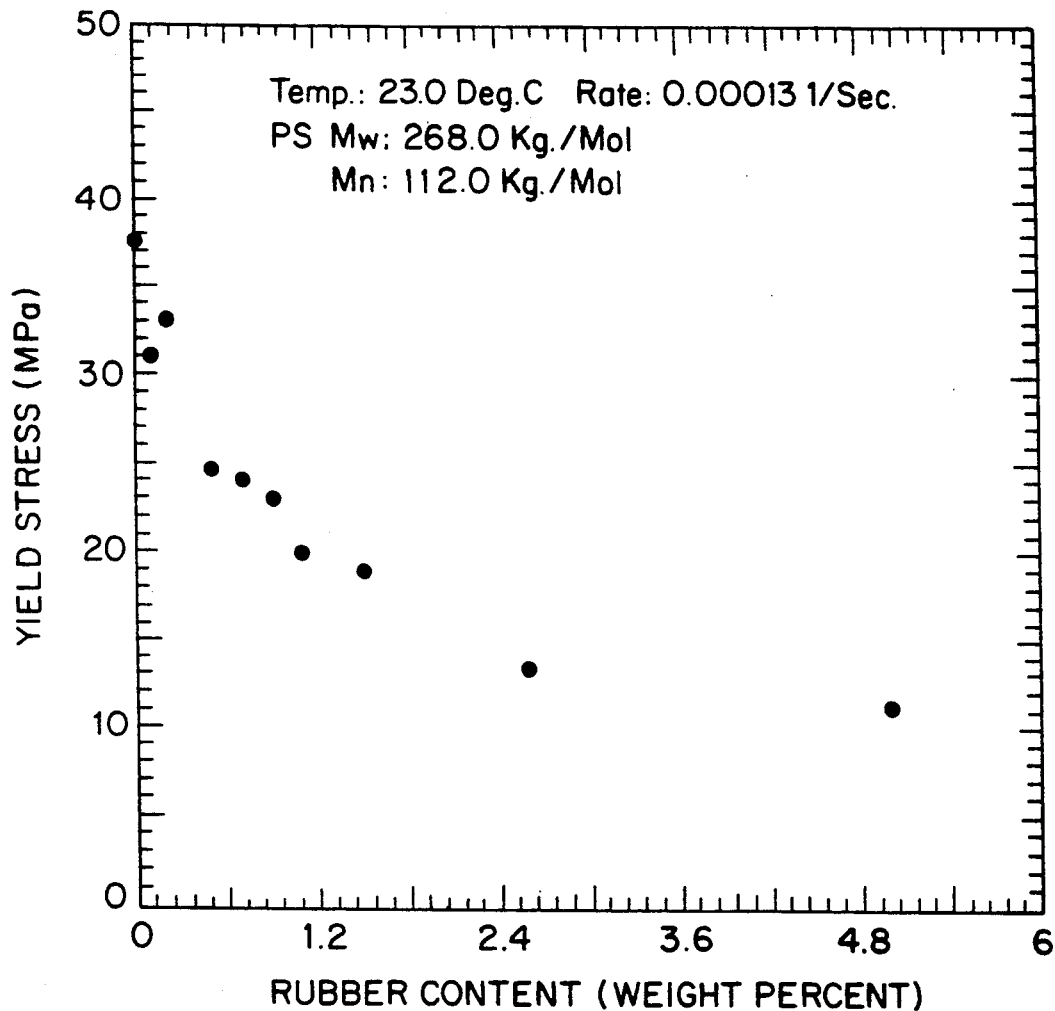
FIG. 2 shows the tensile yield stress versus composition for blends of PB2.76K in PS(HH-101).
Figure 3:
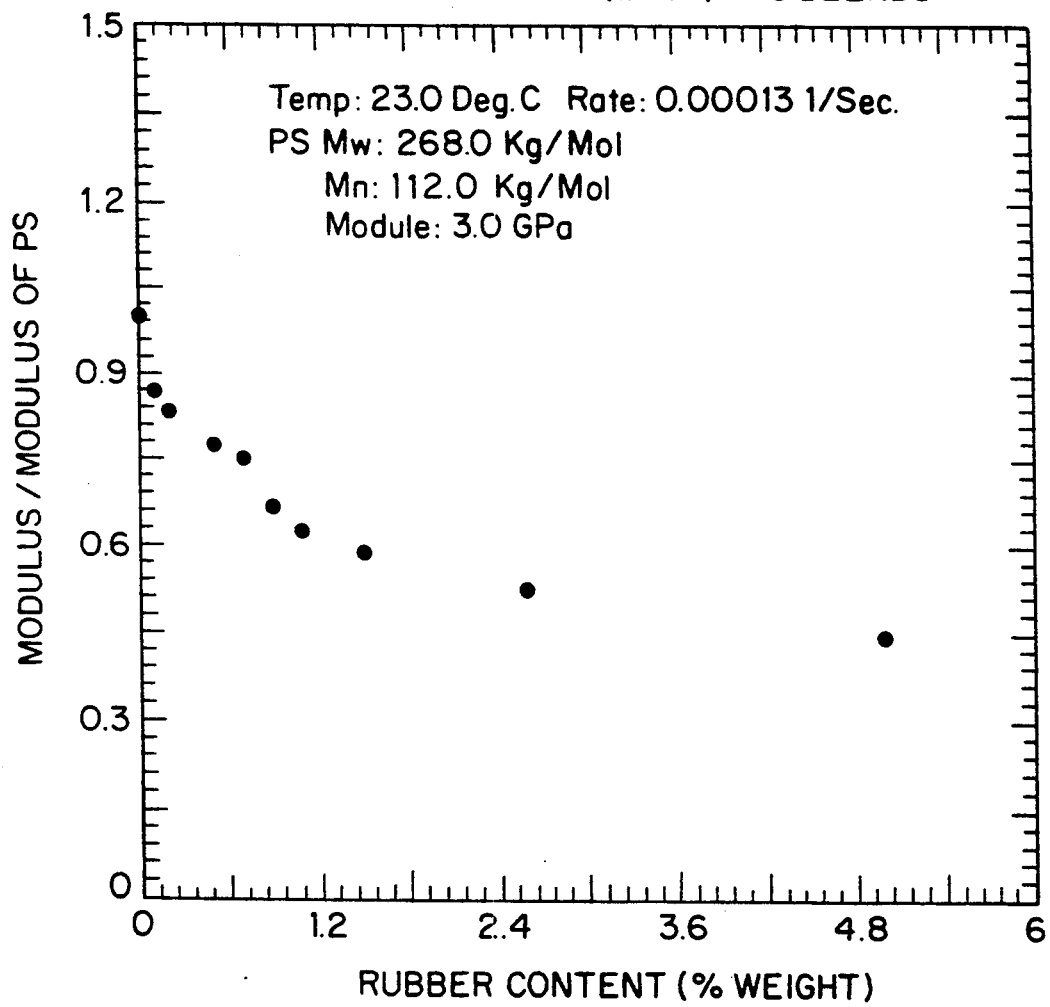
FIG. 3 shows the moduli of PB2.76K in PB2.76K-PS (HH-101) blends in units of the modulus of PS (HH-101).
Figure 4:
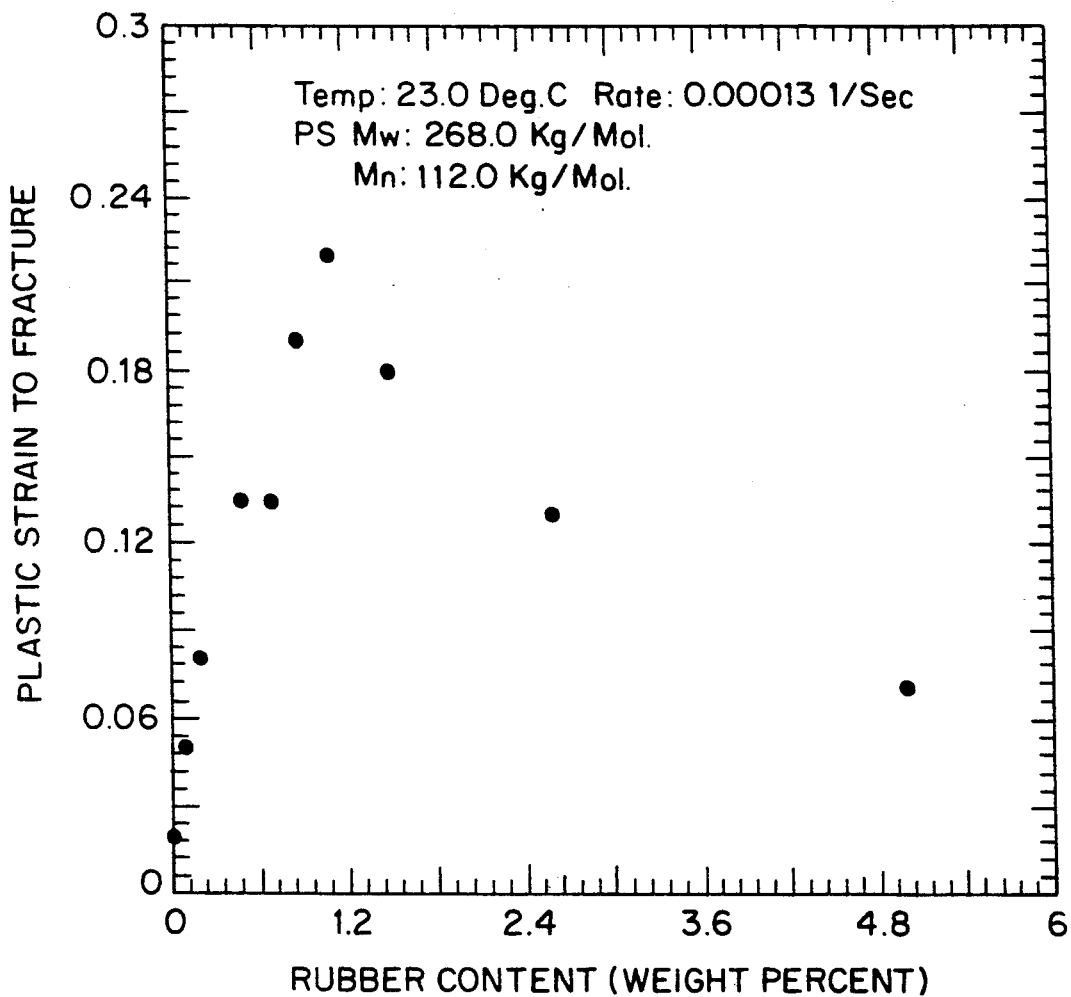
FIG. 4 shows the plastic strain-to-fracture as a function of rubber composition in PB2.76K-PS(HH-101) blends.
Figure 5:
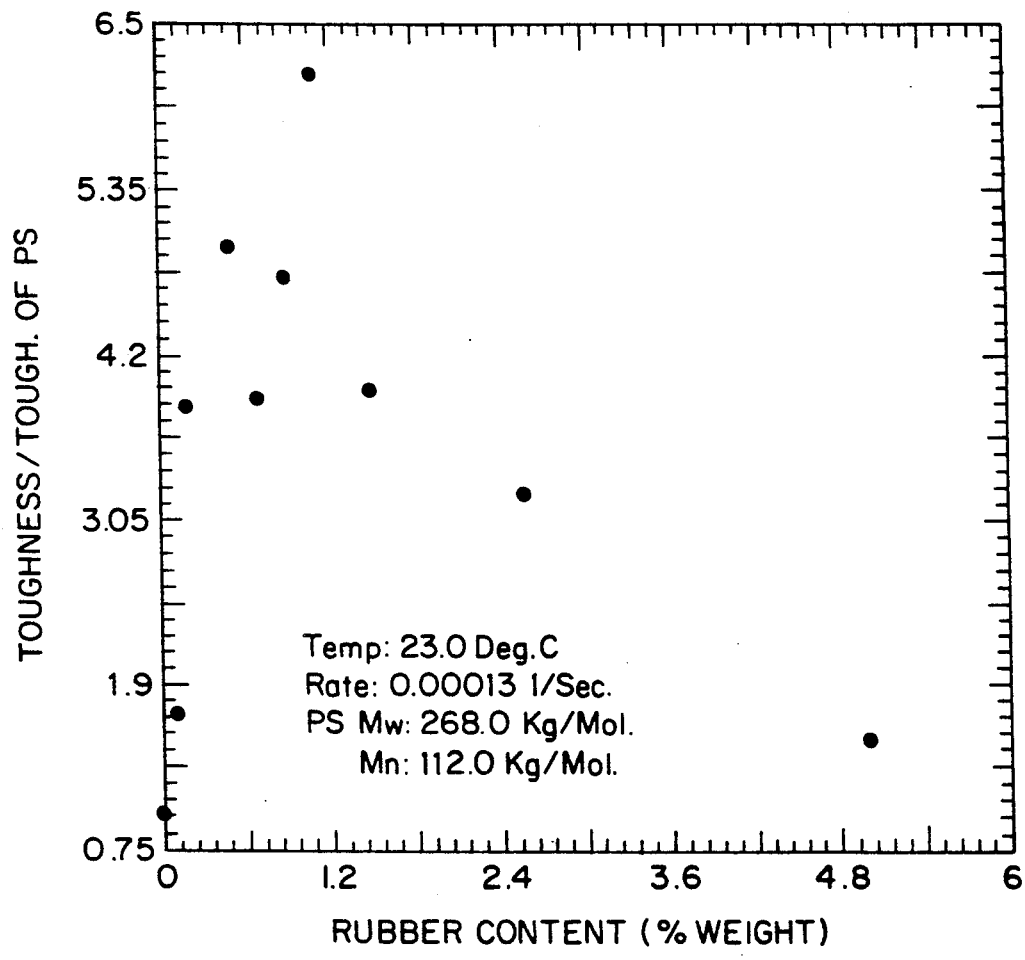
FIG. 5 shows the toughness relative to that of PS (HH-101) as a function of rubber composition.

FIG. 1 gives the tensile curve for broad molecular weight distribution polystyrene, which exhibits brittle behavior in tension. Addition of polybutadiene 2.76K brings dramatic changes in various features of tensile behavior. FIG. 2 shows that craze yield stress drops with PB 2.76K addition initially fast, later gradually. FIG. 3 reveals that moduli of blends decrease with increasing rubber content. Plastic strain-to-fracture shows an increase, goes through a maximum and drops as rubber content is increased from zero to 5.0 wt %. The blend containing 1.1 wt % polybutadiene 2.76K appears to exhibit the largest plastic strain of 0.24 at a rubber content of 1.1% as given in FIG. 4. As a measure of toughness in uniaxial tension, the area under tensile stress-strain curve was calculated and plotted as a function of rubber content in FIG. 5. It is shown that addition of polybutadiene 2.76K to 1.1 wt %, improves toughness by a factor of 6.15.

Figure 6:
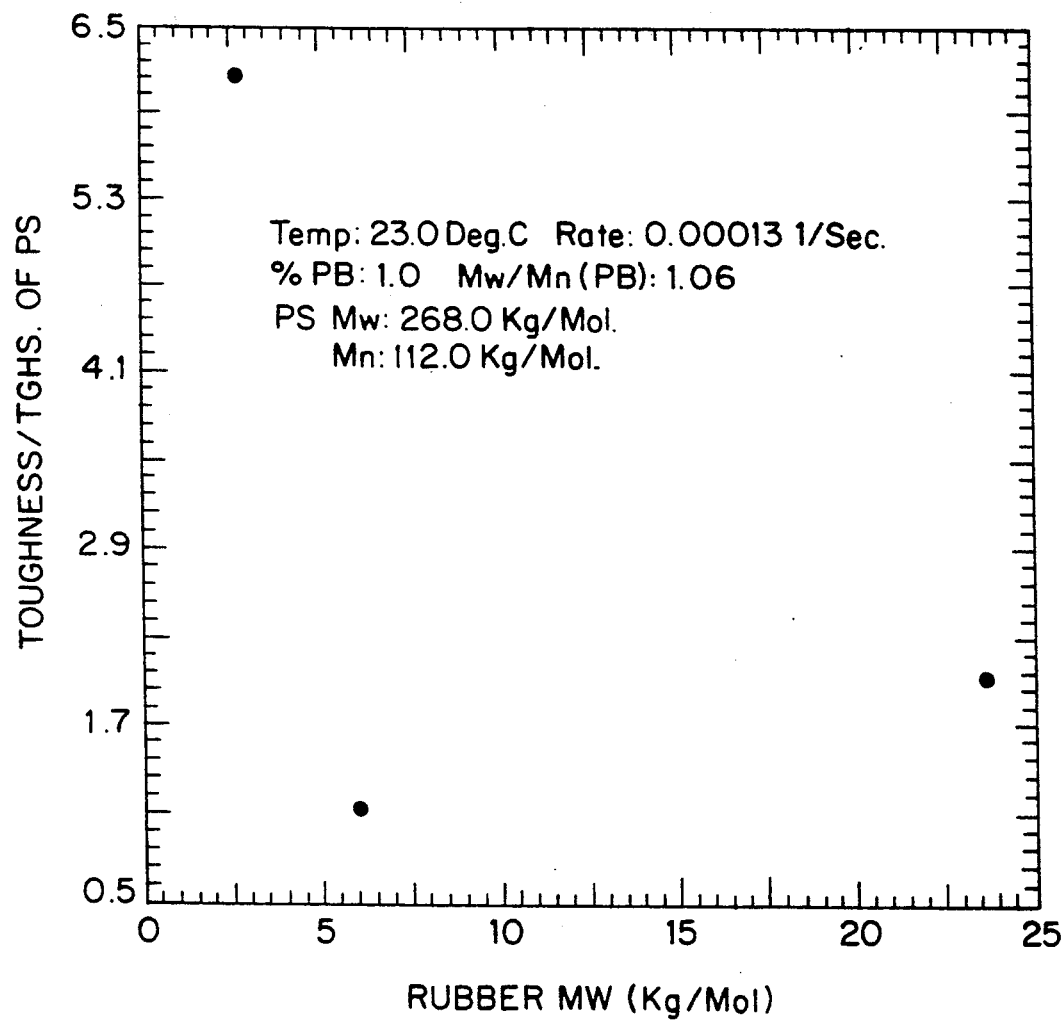
FIG. 6 shows the toughness relative to that of PS (HH-101) as a function of molecular weight of polybutadiene in 1.0% PB-PS(HH-101) blends.

In order to develop an understanding of the role of the rubber molecular weight, polybutadienes of larger molecular weight (6K and 23.6K) were blended with polystyrene at a rubber weight percentage of 1.0. As shown in FIG. 6, for larger molecular weights of rubber, toughness drops to values lower than that of polystyrene. However, this change does not seem to be monotonic.

Figure 7:
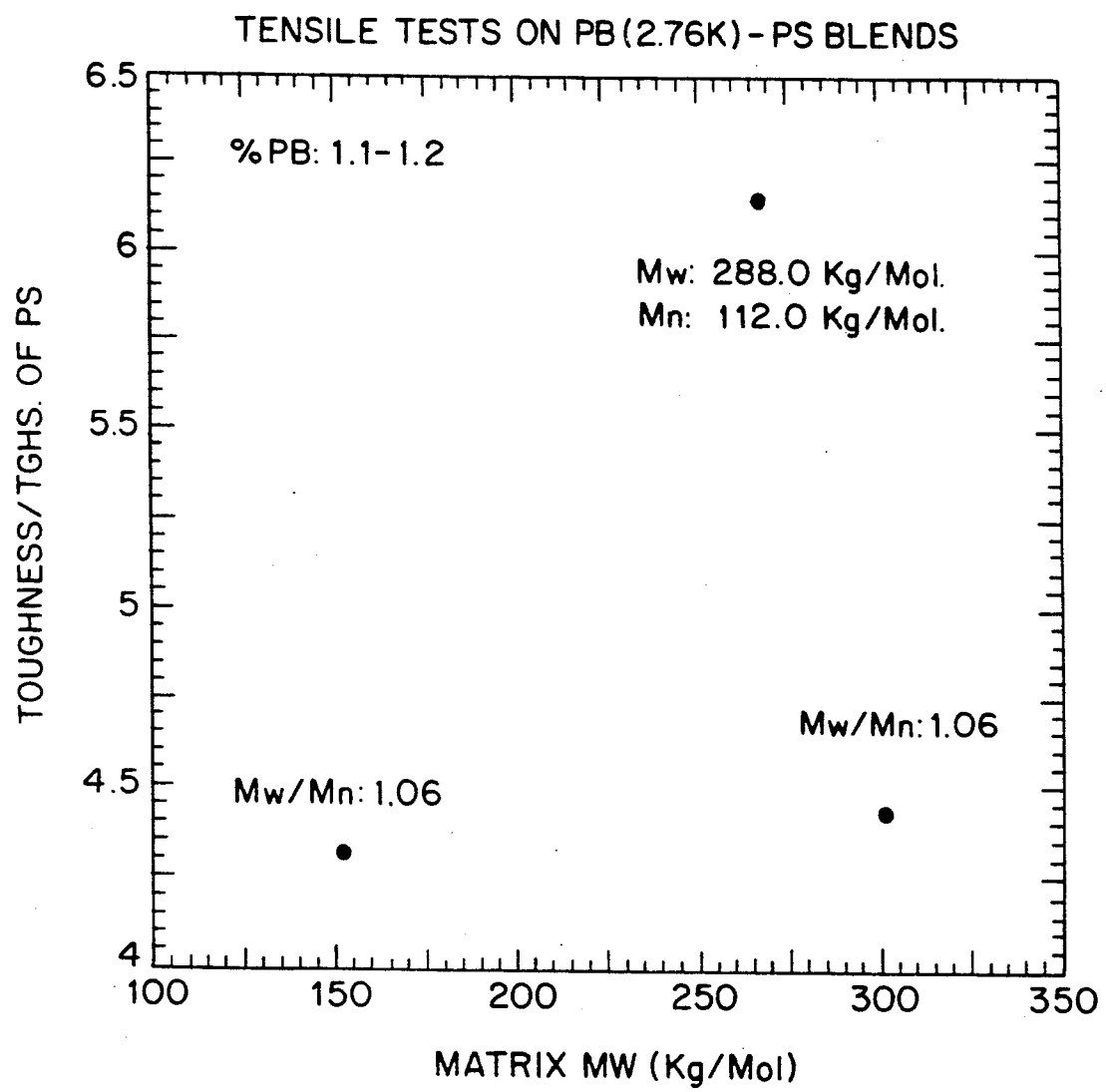
FIG. 7 shows the toughness relative to that of PS (HH-101) as a function of matrix molecular weight and MWD in PB2.76K-narrow weight distribution polystyrene blends.

Low molecular weight polybutadiene (PB2.76K) was blended with narrow mmolecular weight distribution polystyrene (152K or 300K) for an investigation of the role of matrix molecular weight and molecular weight distribution. For 1.1 to 1.2% polybutadiene blends, substitution of polystyrene 142K or polystyrene 300K for polystyrene (HH-101) leads to remarkable changes in morphology and toughness. The major morphological change is the disappearance of concentric shells in particles and appearance of honogeneous rubber particles. FIG. 7 shows that blends with narrow molecular weight distribution polystyrenes are only 4.4 times tougher than polystyrene (Broad Molecular Weight Distribution) whereas polybutadiene 2.76K-polystyrene (HH-101) blend is 6.15 tougher. Although molecular weight differ by a factor of 2, blends containing narrow molecular weight distribution polystyrene and polybutadiene 2.76K are comparable in their toughness.

Figure 8:
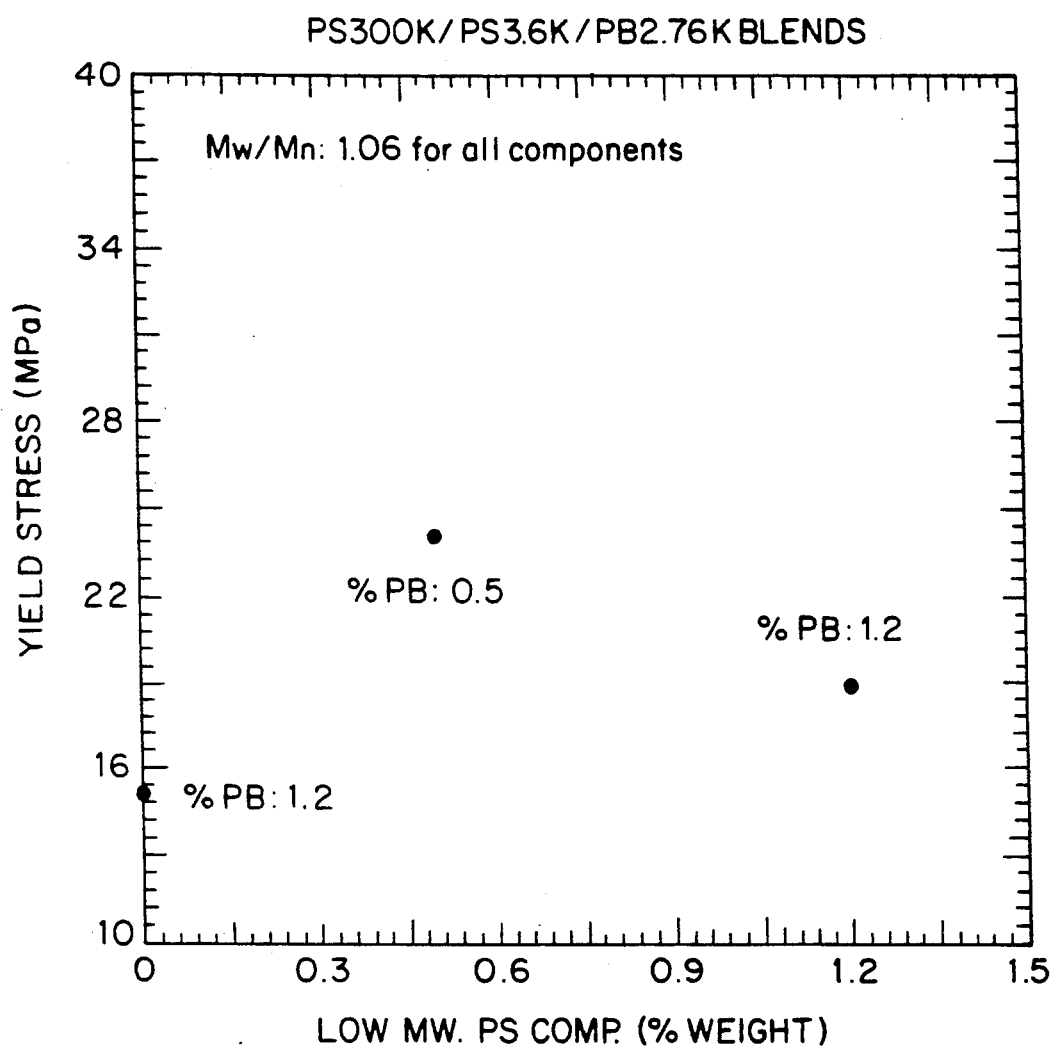
FIG. 8 shows the yield stress as a function of the composition of PS3.6K in PB2.76K-PS300K blends in the PB2.76K composition range of 1.1-1.2% by weight.

With the hypothesis that low molecular weight polybutadienes might have phase-separated with low molecular weight components of the polystyrene matrix to give concentric shell particles, narrow molecular weight polystyrenes were used. It was indeed observed that the concentric shell morphology disappeared. Then it was thought that one could deliberately introduce a low molecular weight polystyrene into a matrix of narrow molecular weight distribution. The studies of morphologies of ternary polybutadiene 2.76K-polystyrene 3.6K-polystyrene 300K blends revealed concentric shell particles and tensile tests show truly dramatic changes in yield stress, modulus, plastic strain-to-fracture and toughness. In FIG. 8, yield stress in shown to increase the introduction of polystyrene 3.6K to polybutadiene 2.76K/polystyrene 300K blend. Modulus and flow stress follow similar trends, too.

Plastic strain-to-fractureexhibits a remarkable change with the addition of polystyrene 3.6K. Blends which contain equal amounts of polystyrene 3.6K and polybutadiene 2.76K give plastic strains which appear to be independent of polystyrene 3.6K composition and larger than that of polybutadiene 2.76K-polystyrene blend. In FIG. 8, a comparison of toughness is presented for blends of varying polystyrene 3.6K content. While change of matrix from polystyrene (HH-101) to polystyrene 300K leads to loss of toughness, introduction of polystyrene 3.6K to polystyrene 300K brings about an increase in toughness. The blend containing 0.5 wt % polystyrene 3.6K and 0.5 wt % polybutadiene 2.76K is tougher since it exhibits a larger yield and flow stress than those of the blend containing 1.2 wt. % polystyrene 3.6K and 1.2 wt. % polybutadiene 2.76K. Table II presents a summary of mechanical behavior-low molecular weight polystyrene composition relationships.

TABLE II

A Comparison of Mechanical Behavior for Polybutadiene 2.76K-Polystyrene 300K Blends

| | PS 300K PB 2.76K | | |
|---|---|---|---|
| | 1.2% PB 2.76K | 0.5% PS 3.6K | 1.2% PS 3.6K |
| Yield Stress, MPa | 15.0 | 24.0 | 19.0 |
| Modulus/Modulus of PS (HH-101) | 0.52 | 0.80 | 0.67 |
| Plastic Strain-to Fracture | 0.19 | 0.25 | 0.25 |
| Toughness/ Toughness of 1.1% PM 2.76K-PS (HH-101) Blend | 0.72 | 1.46 | 1.03 |

EXAMPLE II

Blends of polystyrene (PS) $2.7 \times 10^5 M_w$, $M_w/M_n = 2.4$) with polybutadiene (PB) (cis/trans/vinyl- 45/45/10; $2700 M_w$) were made by spin casting from toluene solutions in the manner that has been described in detail earlier. Samples with a polybutadiene content of greater than 0.45% were visibly cloudy. They were found to contain 0.2- μm mean diameter rubber particles. Strips were cut from these samples for tensile testing in an Instron machine at a strain rate of $1.3 \times 10^{-4} s^{-1}$ at a temperature of 23° C. The microstructure of the crazes was examined by using small-angle X-ray scattering (SAXS) using the A1 beam line at the Cornell synchrotron source CHESS. The samples were crazed in three-point bending and the scattering from the crazed region in the bent sample was recorded at a camera length of 351 mm using a EG&G PARC OMA diode array detector. Mean fibril diameters were obtained by a Porod analysis of these data. A fibril volume fraction for the crazes of 0.25 was assumed in the analysis for all the materials.

Figure 10:
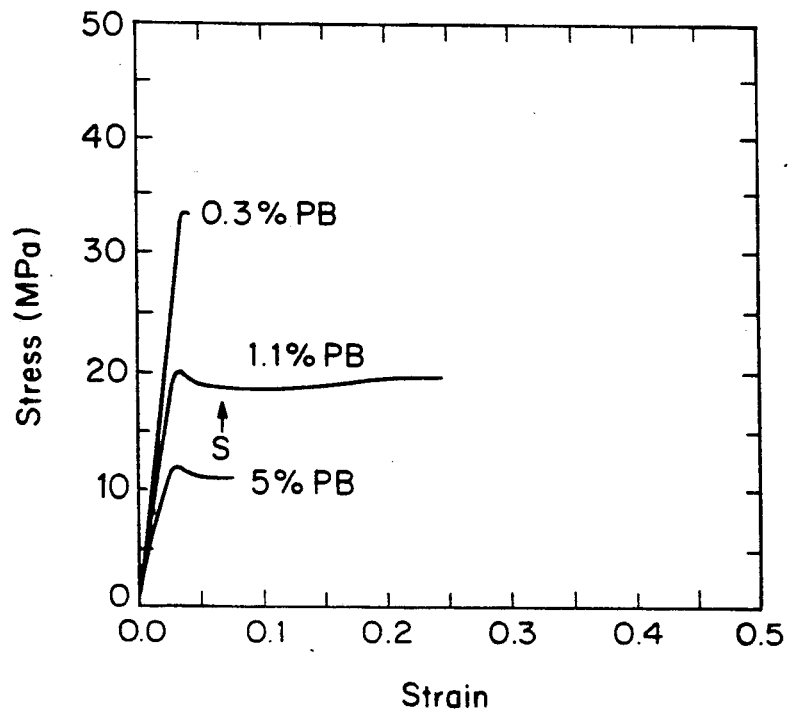
FIGS. 10, 11 and 12 show the results obtained in Example II.
Figure 11:
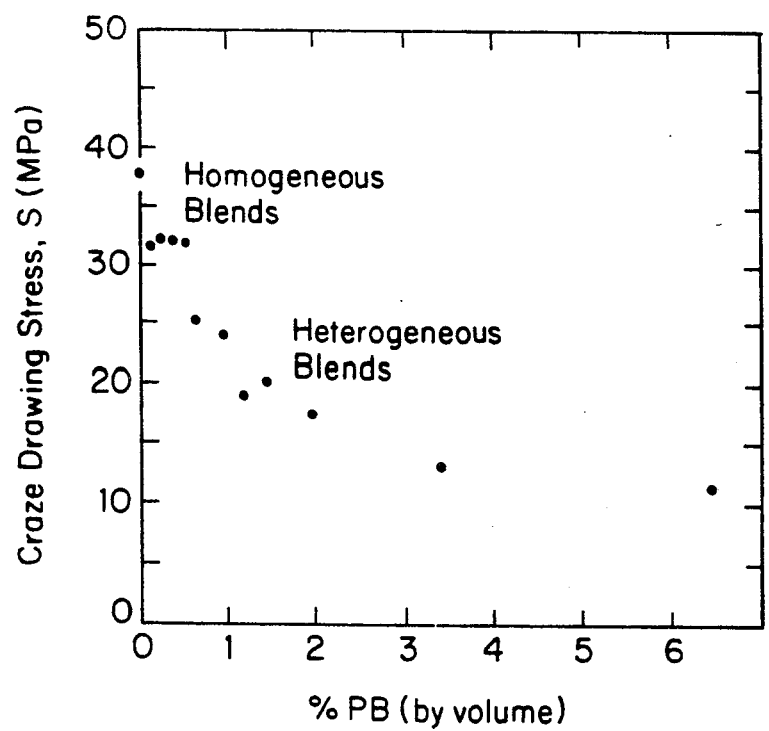
Figure 12:
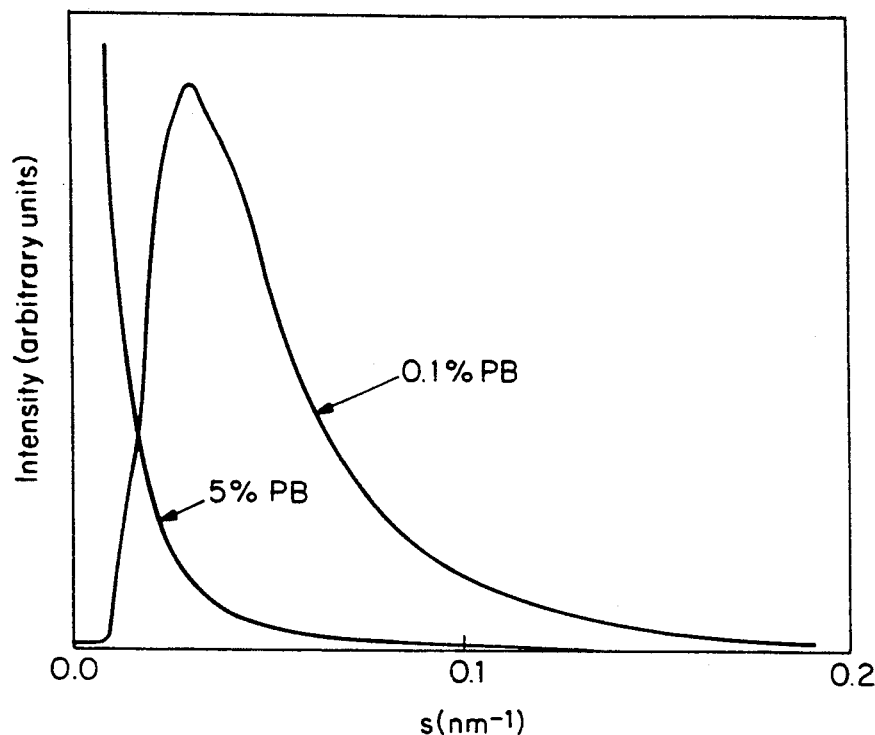

Stress-strain curves for several of the samples with different rubber contents are shown in FIG. 10 while FIG. 11 shows the effect of PB additions on the craze drawing stress of the materials. SAXS curves for two limiting blends are given in FIG. 12. It is immediately evident from these results that the addition of a small amount of low molecular weight PB has a strong effect on the crazing properties of the PS particularly when the PB appears as a separate phase at ca. 0.45 wt. %. The data presented in Table III show that the product of craze drawing stress S, with mean craze fibril diameter D, is constant for these blends.

TABLE III

| PB Concn, wt % | S, MPa | D, nm | SDM J m$^{-2}$ |
|---|---|---|---|
| 0.1 | 32 | 8.7 | 0.28 |
| 0.5 | 24 | 9.3 | 0.22 |
| 0.9 | 17 | 10.3 | 0.18 |
| 1.2 | 19 | 16.4 | 0.31 |
| 1.5 | 15 | 17.1 | 0.26 |
| 5.0 | 11 | 23.9 | 0.26 |

The product SD has previously been shown to be constant, independent of crazing temperature or strain rate, for crazes grown in polycarbonate or PMMA. It is also shown to be constant, independent of plasticizer level, when a low molecular weight plasticizer was added to PS. The invarience of SD follows directly from this model if the craze surface energy and fibril volume fraction are independent of temperature and plasticizer level. Hence, the fact that SD was found to be independent of PB level in the results presented above is evidence that the low molecular weight PB acts by a plasticization mechanism and not just as a craze initiation source or a surface energy modifier. When a low molecular weight plasticizer (dibutyl phthlate) is added to polystyrene, a plasticizer concentration of 15% is required to reduce the craze drawing stress by a factor of 1; in contrast only 1.5 wt % is required for the same reduction using low $M_w$ PB most of which is present as separate particles. Apparently not only is the low $M_w$ PB an enormously efficient plasticizer but its efficiently continues to increase when its solubility limit is exceeded. This paradox can be explained by the effects of local stress on equilibrium absorption of an oligomer or low molecular weight polymer into a high molecular weight polymer.

The active zone at the craze-matrix interface, the thin layer from which polymer is drawn into the craze, should be under considerable hydrostatic tension$\sigma$. This hydrostatic tension is expected to increase greatly the equilibrium solubility$100_s$, of an oligomeric fluid (partial molecular volume$\Omega$) in the polymer. The hydrostatic tension can be considered as a negative osmotic pressure as long as the fluid itself is not subject to $\sigma$, a condition fulfilled in this instance because the PB particles cavitate. From Flory-Huggins theory of polymer-polymer solution it has been shown that as long as $\phi_s$ is small. While the $\phi_0$ estimated $$\phi = \phi_0 exp\ (\sigma\Omega/kT)$$

from either the appearance of PB particles above 0.45 wt. % or from the Flory-Huggins parameter (ca.0.1) for PS-PB is low, the application of even small hydrostatic tension increases it considerably. For example, as the hydrostatic tension $\sigma$ must be at least S/3, for the smallest S observed, 11.3 MPa, must be at least 3.7 MPa and this gives $\phi_s/\phi_0 > 95$, yielding a $\phi_s$ of greater than 0.4. This stress-enhanced absorption appears to be the reason for the apparent high plasticizing efficiency of the PB.

The continued decrease in crazing stress and increase in fibril diameter of PB volume fractions above the solubility limit $\phi_0 = 0.0045$ shows, however, that the PB absorption in the active zone of the growing craze cannot be an equilibrium phenomenon; if it were, there should be no further change in S or D for $\phi > \phi_0$. Rather these changes imply that there is a kinetic limitation of the supply of PB molecules to the craze interface away from the PB particle reservoirs. (Exhaustion of these reservoirs cannot be responsible for the relatively high values of S (and low values of D) at low $\phi$'s since S is approximately constant with time during the craze growth as shown in FIG. 10). PB molecules must diffuse away from the particle reservoirs along the surface of the polymer in the craze and dissolve in the active zone. The volume fraction in the active zone under these conditions $\phi_{sk}$ is found from a balance of fluxes to increase strongly as the spacing d between the PB particles decreases. The $_{100sk}$ scales approximately as $1/d^2$ and so increases substantially when exceeds $\phi_0$ if the particle size remains roughly constant as indicated by the electron microscopy results.

Below the solubility limit, however, the PB is distributed uniformly (and immobilized) throughout the glassy PS. Little or no free PB is available to migrate along the craze surfaces and hence little effect of PB content is predicted in this regime, in agreement with our further observation that only token decreases in S occur at PB contents below the solubility limit.

It is this increase in $\phi_{ski}$ that is thought to cause the decrease in the crazing stress S observed once the solubility limit is exceeded. There is no specific requirement that the PB concentration be high at the craze tip, since decreasing the plastic resistance of the active zone in the region behind the craze tip will lead to higher craze tip advance rate.

It is also worth pointing out that cross-linked rubber particles as small as 0.2 $\mu$m in diameter are not effective craze initiators in PS; the regions of high stress concentrations are too small in volume to allow a craze nucleus to form. Thus the crazes here are expected to initiate, as for pure PS, from surface imperfections primarily. Neither the large drop in crazing stress nor the corresponding large increase in the D as the PB volume fraction increases can be due to the simple stress concentration effects of the PB particles. The increases in D in particular signifies that the PB must strongly affect the craze widening (fibril drawing) process and not just craze initiation.

We therefore propose that the basic mechanism by which low $M_w$ PB acts to toughen PS is one in which there is a hydrostatic tension-enhanced dissolution of the PB in the active zone along the craze interfaces with the PB diffusing along these interfaces from rubber particle reservoirs. The dissolved PB acts as a plasticizer thus decreasing the craze fibril drawing stress. The toughening mechanism should occur in any system where an incompatible low molecular weight rubbery polymer is finely enough dispersed in a glassy polymer matrix. It may even be a factor in normal rubber-toughened polystyrene where there could be a significant low molecular weight sol fraction dissolved in the rubbery particles. In this context it is relevant to note that craze fibrils and craze interfaces are stained dark by exposing the samples to $O_sO_4$. This phenomenon has been ascribed to the reaction of $O_sO_4$ with double bonds produced as decay products of the radicals created by the chain scission inherent in the crazing process and/or unknown molecular heterogeneities on the surface of fibrils. The first hypothesis does not explain why the craze staining in the PB-modified PS is much stronger than that in crazes in pure PS. The extra staining observed in high-impact polystyrene (HIPS) may then be the staining of the low molecular weight unsaturated rubber fraction which diffuses out from the rubber particles along the craze-matrix interfaces during craze growth.

EXAMPLE III

In this example the novel mechanism of toughening via rubber is coupled with the craze initiating mechanism of larger conventional compliant particles which have been used to toughen HIPS and ABS in the past. The synergistic, addictive toughening process produces useful materials which can be tough in a variety of geometrics including those with large dimensions for which surface nucleation of crazes is not an important contribution to toughness.

The resins used were as follows: granules of (1) polystyrene (PS, Polysar 101, Monsanto Plastics & Resins Company) with a molecular weight of 300,000 Mw and a molecular weight distribution of 2.39 (Mw/Mn). (2) acrylonitrilebutadiene-styrene copolymer (ABS, Polysciences, INC.); viscous fluids of (1) polybutadiene (PB, Polysciences, INC.) with a molecular weight of 3,000 Mw and 16% 1,4-structure and 84% 1,2-structure, (2) polybutadiene (PB, Polysciences, INC.) with a molecular weight of 2,6000 Mn and 71% 1,4-structure and 29% 1,2-structure, (4) polybutadiene (PB, Scientif Polymer Products, INC.) with a molecular weight of 3,400 Mn and 74% 1,4-structure and 26% 1,2-structure. Two or three of the polymers were dissolved in reagent grade toluene with a ratio of 5 g polymer to 300 ml solvent. The solutions left overnight in a flask were slowly dropped into a nonsolvent bath which contained 1500 ml methanol and completely precipitated. The precipitated polymer blends were dried in a vacuum oven for more than 24 hours at 60° C., then were compression molded into films about 0.5 to 1.0 mm thick at 170° C. on a laboratory press.

The molded films were trimmed into tensile testing specimens with fresh surgical blades on a 'dog-bone' template with a 6.35 mm gauge length and a 3.18 mm gauge width. To eliminate nucleation of unwanted crazes at surface imperfections, four surfaces of each specimen were polished with 0.3 $\mu$m aluminum slurry. The polished specimens were washed in a dilute detergent solution, rinsed thoroughly, hung vertically in a vacuum oven and dried for 48 hours at 80° C.

The TEM study of the compression-molded thin films was investigated using a Phillips 300 transmission electron microscope operating at an accelerating voltage of 100 kV. The specimens were stained by immersing them for 7 days in a 1% aqueous solution of osmium tetroxide to enhance absorption contrast between the PB and the PS phases, followed by thorough washing. This staining could be performed either before or after straining. Ultrathin sections were cut on an LKB-8800 ultramicrotome fitted with a freshly prepared glass knife and then transferred to a copper grid suitable for transmission electron microscope. Section thickness was kept in a range of 200 to 400 angstroms. For the TEM observation of craze microstructure, the crazed specimens cut from the whitened zone of the broken specimens after tensile tests were stained in the 1% aqueous solution of OsO4 for 5 days. The cuts in the ultramicrotome were made in a direction approximately 45° to the principal tensile axis. The sections were taken across the thickness of the specimens at right angles to the craze planes to produce the minimum number of artifacts on the craze microstructure.

For tensile tests, an Instron Machine Model 4201 was used. The tensile speeds were controlled at $2.6 \times 10^{-4}$ sec-1. The experiments were conducted at almost constant temperature (23° C.) and around 50% RH. The obtained load-elongation curves gave the following four mechanical quantities: (1) maximum load at yield or breaking, (2) extension to failure, (3) breaking energy indicated by the area under the curves, and (4) modulus of elasticity.

Figure 13:
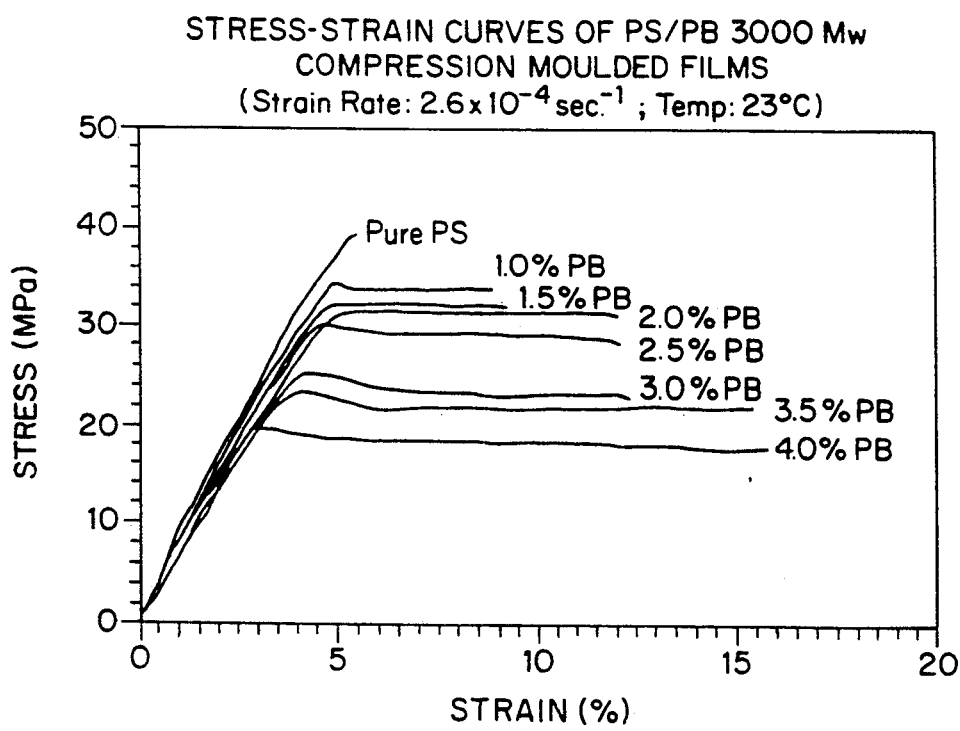
Figure 14:
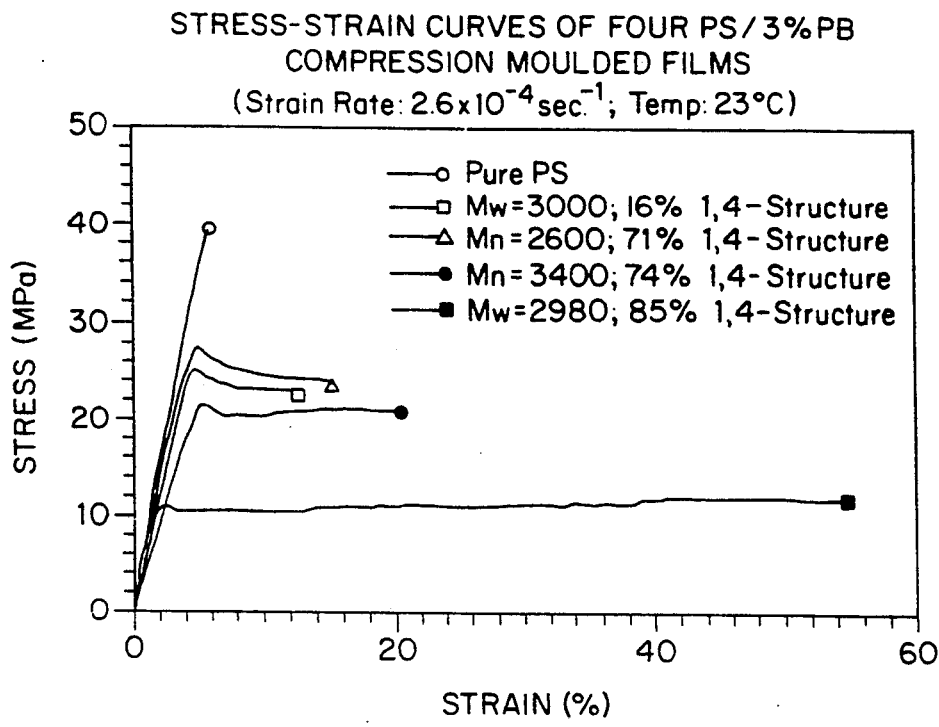
Figure 15:
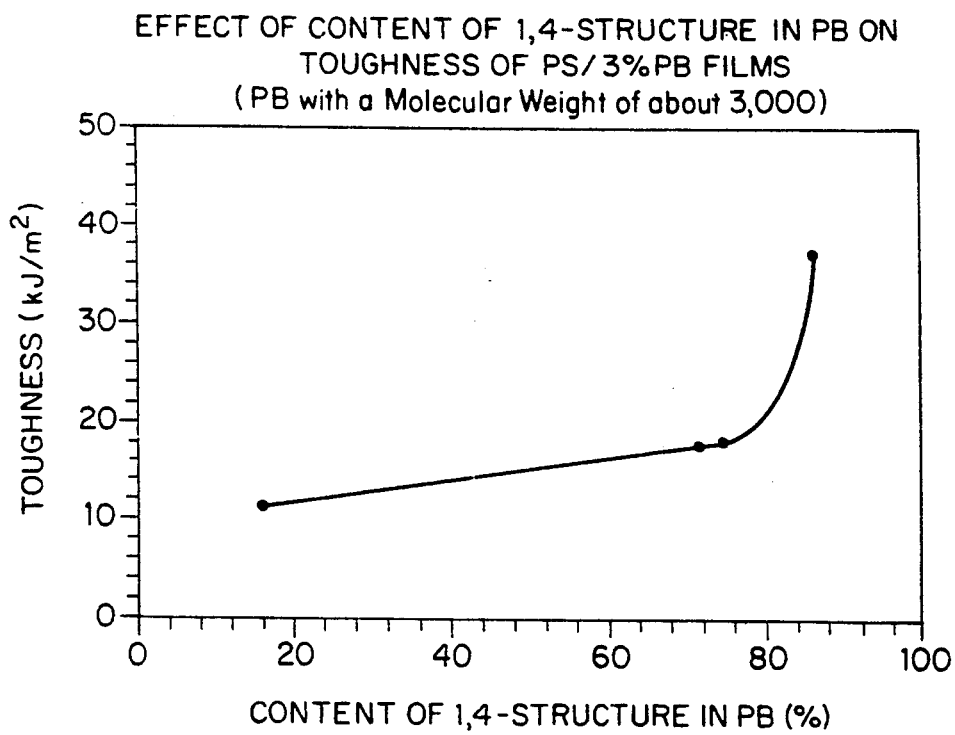

There is conclusive evidence that the introduction of liquid polybutadiene effectively toughens brittle polystyrene. The liquid PB particles in the PS matrix act as (1) a plasticizing agent to make the PS crazing at low stresses, (2) a strengthening agent to make the crazes which are filled with the liquid PB growing longer to avoid early craze fracture. As shown in FIG. 13, the stress-strain curve of the pure PS film illustrated a very brittle behavior with a high yield stress and a quite small fracture strain, 0.5% PB with only 16% 1,4-structure (Polysciences, INC.) blended into the PS could reduce the yield stress 15% with no improvement in fracture strain. In comparison, the stress-strain curve for the blend molded film 1% indicated a significantly increased strain-to-fracture ratio of around 5% and no changes in the yield stress. In the blend films, as the content of the liquid PB increased from 1.5% to 4.0%, the yield stresses had gradually dropped from 34 MPa to 20 MPa and the fracture strains had increased from 5% to 15%. These changes resulted in an increase of the tensile toughness as listed in Table IV. When the blend film contains 3% PB, the tensile toughness reached a maximum about 17.5 kJ/m2, which is about 11 times as large as that of the pure polystyrene. Excessive PB added lowered both the yield stress and the fracture strain tremendously. The decreases are due to the existence of the PB particles with a size larger than 1 μm. The problem is agglomeration of the PB particles as the blend materials contain more and more PB polymer. Larger rubber particles could lower the toughness of the blend materials. Therefore, 3% liquid polybutadiene is a maximum content, or a limit in other words, to toughen brittle polymers for the present precipitation-molding film permeation. The polybutadiene we used here is with a 16% cis-1,4 or trans-1,4 and 84% vinyl-1,2. 1,4-structure in the PB units helped improve the tensile toughness much more than 1,2-structure. We could keep using 3% PB and select a PB with more 1,4-structure to further improve the toughness of the PS polymer. FIG. 14 shows the stress-strain curves of four PS/3%PB molded films. The effect of content of 1,4-structure on the toughness of those films is shown in FIG. 15. The PB molecular microstructure greatly affects the tensile toughness. That is because the viscosity of the PB is lowered quickly as the content of 1,4-structure in the PB increases. Lower viscous liquid PB could be even easier to drain into the initiated crazes than higher viscous ones, that means a better solvent crazing action.

Figure 17A:
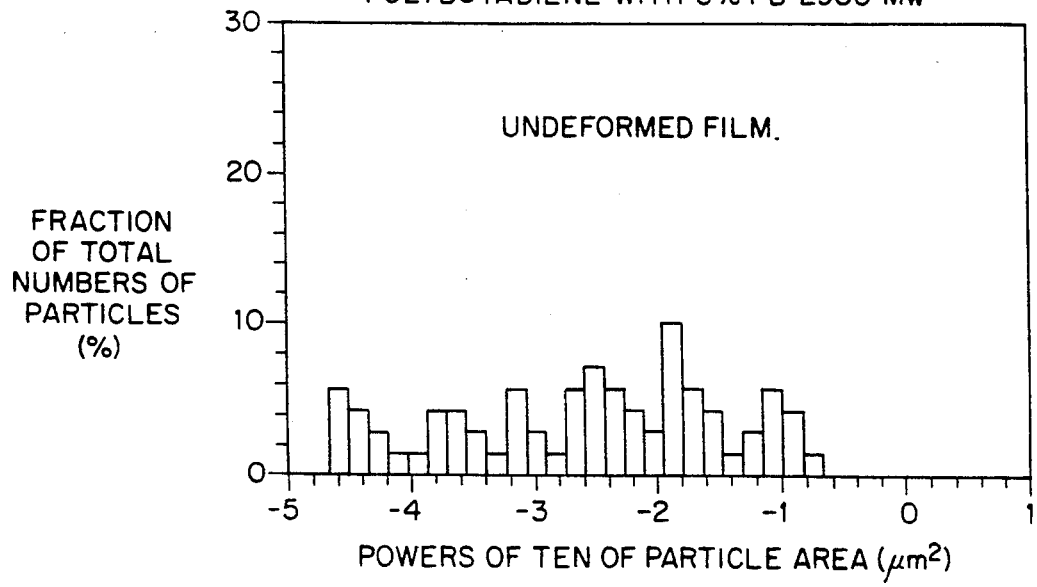
Figure 17B:
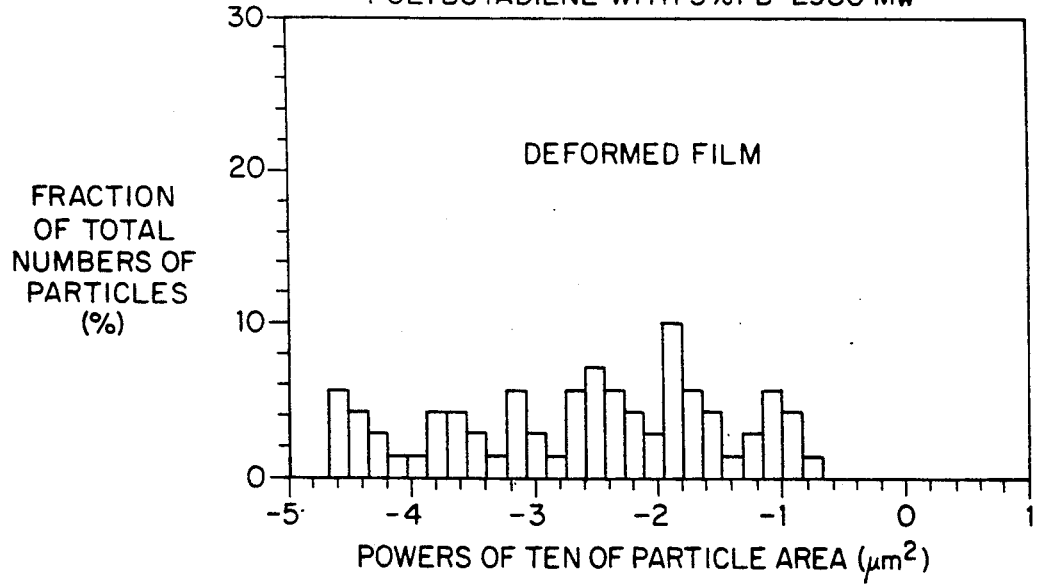

An evidence of liquid polybutadiene draining into initiated crazes could be deduced from FIGS. 16A and 16B. These figures show a change of PB particle dispersion from (A) undeformed to (B) deformed polystyrene films with 3% PB. The undeformed film contained much more rubber particles than the deformed film. The latter one had many long crazes which contained liquid rubber. The loss of the PB particles reveals that part of liquid rubber really drained into the initiated crazes. The crazes filled with liquid PB became much mmore strength than the porous crazes and could grow very long. The change of the dispersion of the PB particles are measured by a Magiscan Image Analyzind Computer manufactured by Joyce-Loebl. The result is shown in FIG. 17. The disappeared rubber particles during the process of straining are those with a size range from $1 \times 10^{-4}$ μm² to $1 \times 10^{-2}$ μm² in area, or from 0.01 μm to 0.1 μm in diameter. That means those particles are effective particles to toughen polystyrene, and other beyond the size range are ineffective to toughen PS.

Figure 19:
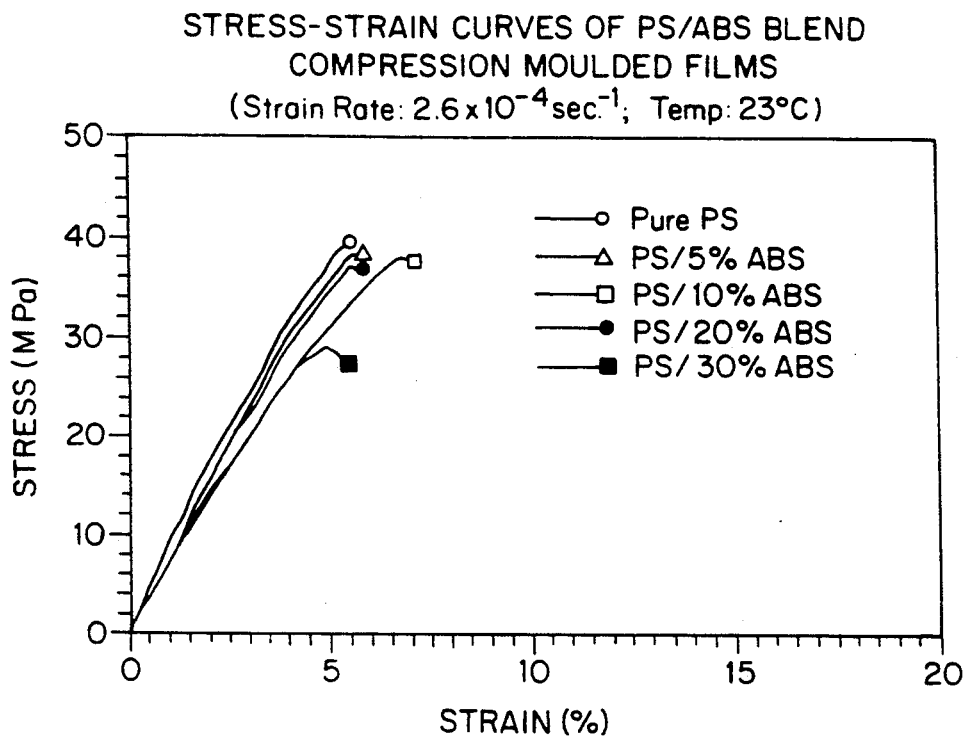

FIG. 18 shows a TEM micrograph of a commercial ABS copolymer manufactured by Polysciences, INC. In the ABS, the rubber particles are not simple droplets. They are composite particles. Compared FIG. 16 with FIG. 18 we could see that the volume fractions of the rubber particles are quite different in the two kinds of polymer blend materials. The fraction in the ABS is about 0.5, but that in the liquid PB toughened PS is less than 0.05. The difference is about 10 times in all, which results in the particle spacings in the ABS much shorter than those in the PB toughened PS. The craze morphologies in the ABS and the PB toughened PS are also quite different from each other. In the former copolymer, crazes are very short and similar to those in the pure polystyrene. They could not become longer and easier to develop into cracks. On the contrary, the crazes filled by liquid PB, in the latter case, are very long and strong. They can undergo a very long loading time and much difficult to convert into cracks. For the ABS copolymer, the toughness improvement is resulted from energy absorption by the large number of crazes, and that for the liquid PB toughened polystyrene by much strength crazes. FIG. 19 and Table V illustrated the results of tensile tests for the PS/ABS blend molded films. We used different amount of ABS to blend with polystyrene but found that no toughness improvement obtained within a wide range of ABS content from 5% to 30%, though the pure ABS us a vert tough polymer. We could find the reason from their corresponding dispersing morphology which are shown in FIG. 20 A-D. As the content of ABS increases from 5% to 30%, the number of composite particles gets more and more, and the particle spacings are still longer that 2 μm. We have already known that the crazes in the pure PBS could only be developed into a length not longer than 2 μm without toughening by liquid PB. Therefore, a necessary condition for this toughening method is that there must be no particle spacings longer than 2 m in the ABS or its blends. That is why the PS/ABS films with from 5% to 30% ABS have no improvement in toughness.

Figure 22:
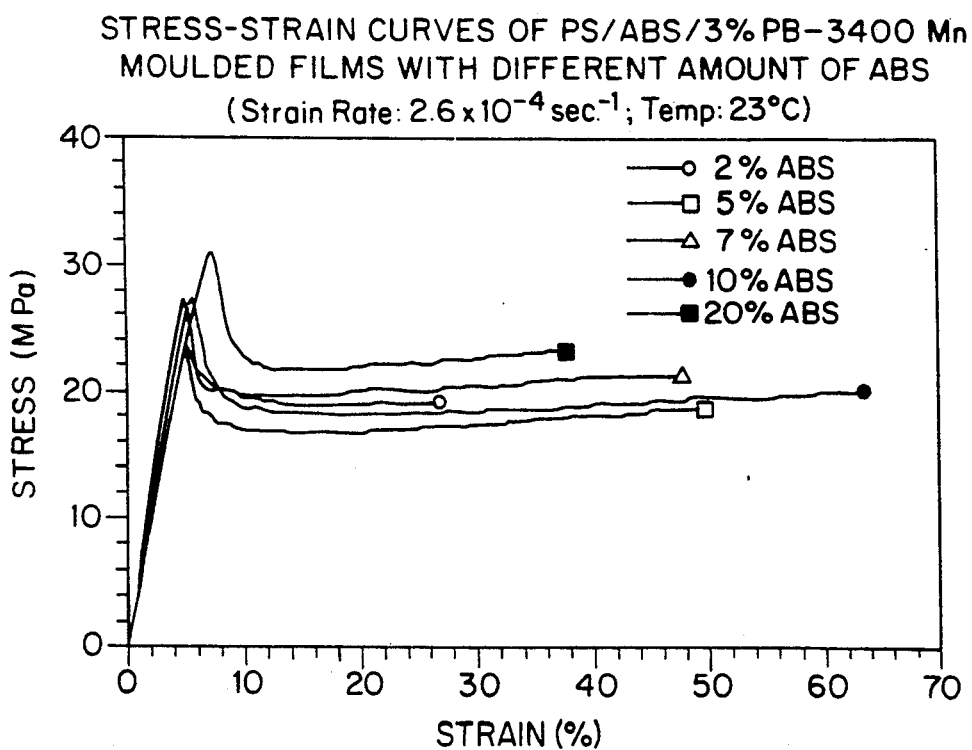

ABS composite rubber particles contribute to craze interaction and liquid polybutadiene particles to craze reinforcement. When polystyrene is blended with both ABS and liquid rubber, the toughness of the obtained materials is absolutely improved very much because the two measures described above are combined. FIG. 21 A-D shows a group of TEM micrographs of PS.ABS-.OB-3400 Mn films which contain 5% to 20% ABS and 3% PB. All four materials exhibit composite rubber particles and simple liquid PB particles in the PS matrix. Bad uniformity of particle spacings and sizes was found for the two kings of particles. The average size of the rubber particles were about 1.5 μm in diameter for teh ABS composite ones and 0.1 μm for the simple Pb particles. FIG. 22 and Table VI present the results of tensile tests for the ternary polystyrene blend films with 3% PB-3400 Mn and 0 to 20% ABS. Introduction of the ABS into the liquid PB toughened PS results in an incredible improvement in tensile toughness. The yield stress of the PS/2% ABS/3%PB is seen to be near 23

Figure 23:
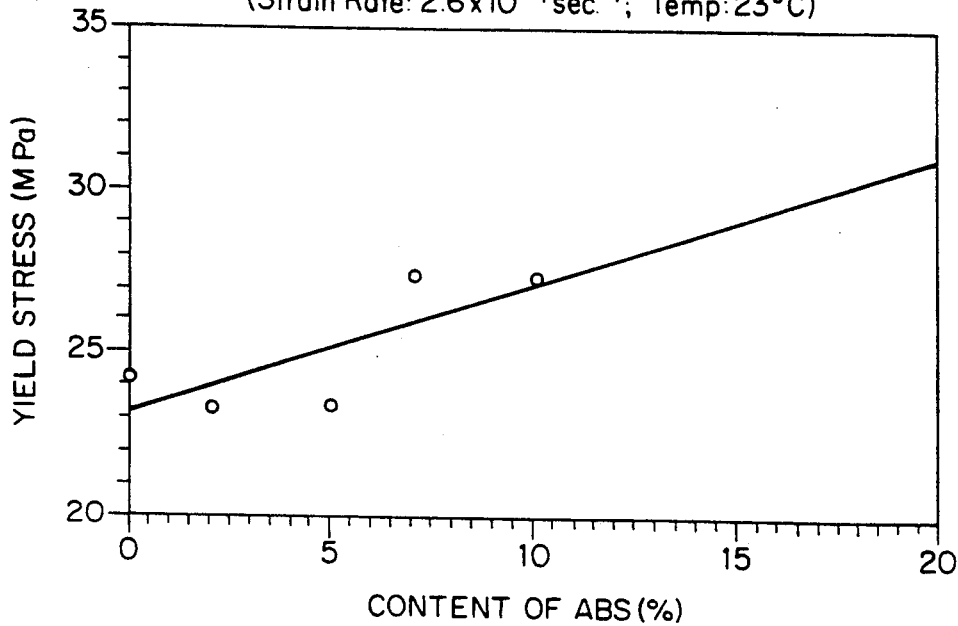
Figure 24:
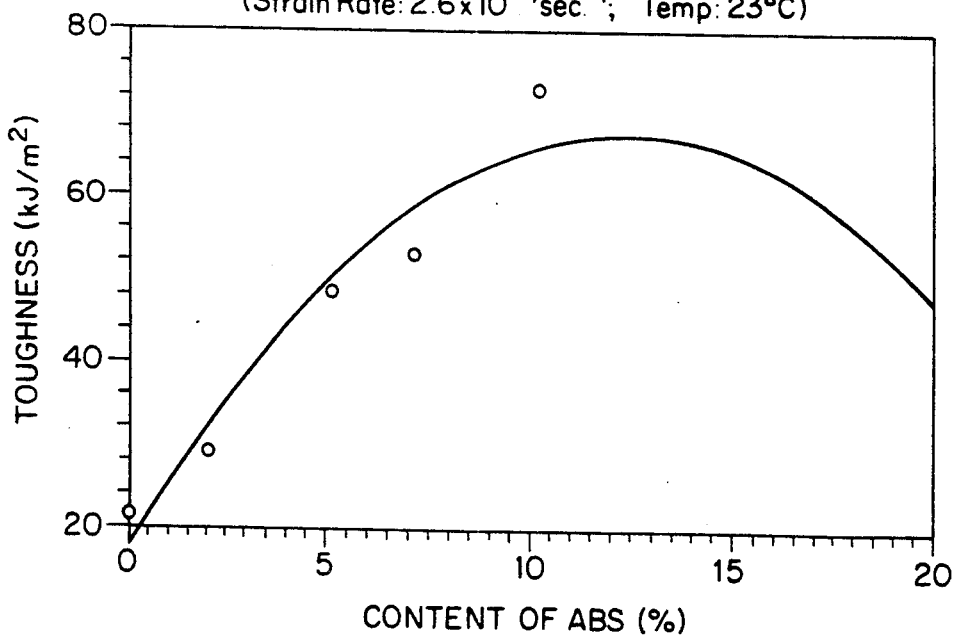

MPa with a fracture strain of about 24%. When ABS content increases to 5%, the fracture strain indicates a great increase from 24% to 46% with no change in the yield stress. In the ternary blend films with more than 5% to 20% ABS the yield stresses have gradually increased from 24 MPa to 31 MPa (see FIG. 23), the fracture strains have first increased from 46% to 59% and then decreased to 31%. A turning point appears at the content with 10% ABS. All these increases and decreases produce a maximal tensile toughness of 72.9 kJ/m2 at the turning point. This toughness is 46 times as large as that of pure polystyrene. The change in tensile toughness as the amount of the ABS increases in the ternary blend films is just the same as the change in fracture strain. FIG. 24 shows the change.

Figure 26:
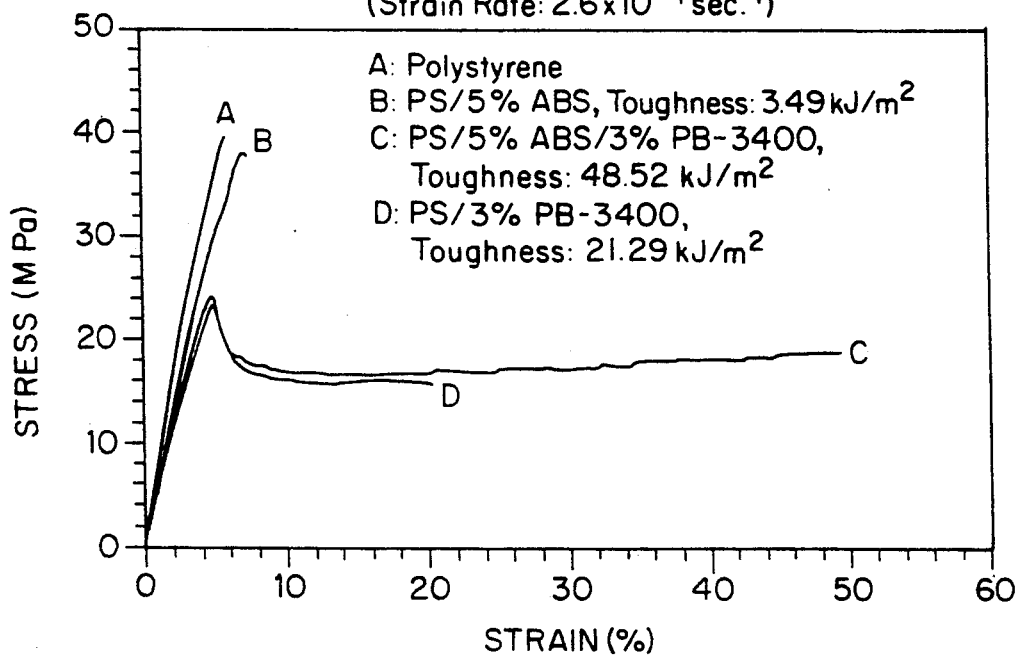

In order to know the reason why the ternary blends have so high toughness, it is necessary to investigate craze morphology of these materials. FIG. 25 A-D shows the craze morphology. Both the crazes initiated by teh PS matrix and by the ABS particles are very long due to the reinforcement of the liquid polybutadiene. The ABS particles look like crosslinked points. The crazes form a kind of network with the help of the ABS composite particles. The liquid polybutadiene drains not only into the crazes in teh PS matrix, but also into the crazes in the border between the PS matrix and teh ABS composite particles. This is an important discovery. At least, there are three advantages to be used from this method:

(1) First, it allows preparation of the PS/ABS/PB blend films with a much higher toughness than either the PS/ABS or PS/PB films. PS/5% ABS/3% PB film can be an example as shown in FIG. 26.

(2) Second, it ensures that there are enough craze initiators inside the blend system to prevent any probable loss in toughness for large bulk samples due to the loss of the crazes initiated by surface imperfections.

(3) Third, it is the only way to produce super-tough blend materials. For example, the ABS copolymer we used in this study is a kind of excellent material with very good roughness. We could also produce a ternary polystyrene blend which is more tough that the ABS, just using 10% ABS by our new method.

An unenpected result was found in the study. 20% ABS used in the ternary blends reduced the toughness. After carefully thinking about this result, we believed that the PS matrix phase was disordered by the acrylonitrile-styrene copolymer in the ABS. The commercial ABS is a mixture copolymer and composed of acrylonitrile-butadiene-styrene copolymer. The ternary copolymer appears as the composite particles in the blend system, but the binary copolymer mixes with polystyrene into the matrix phase. As the binary copolymer gets more and more, it trends toward separating with teh PS and forming its own phase, which causes a hugh change in teh PS matrix phase then a drop in toughness. If we can completely separate the binary copolymer from the commercial ABS and only use the ternary copolymer to blend with the PS and the PB, it can be predicted that toughness of the PS/ABS/PB blend films can be continuously enhanced simply by increasing the ABS amount.

Figure 27:
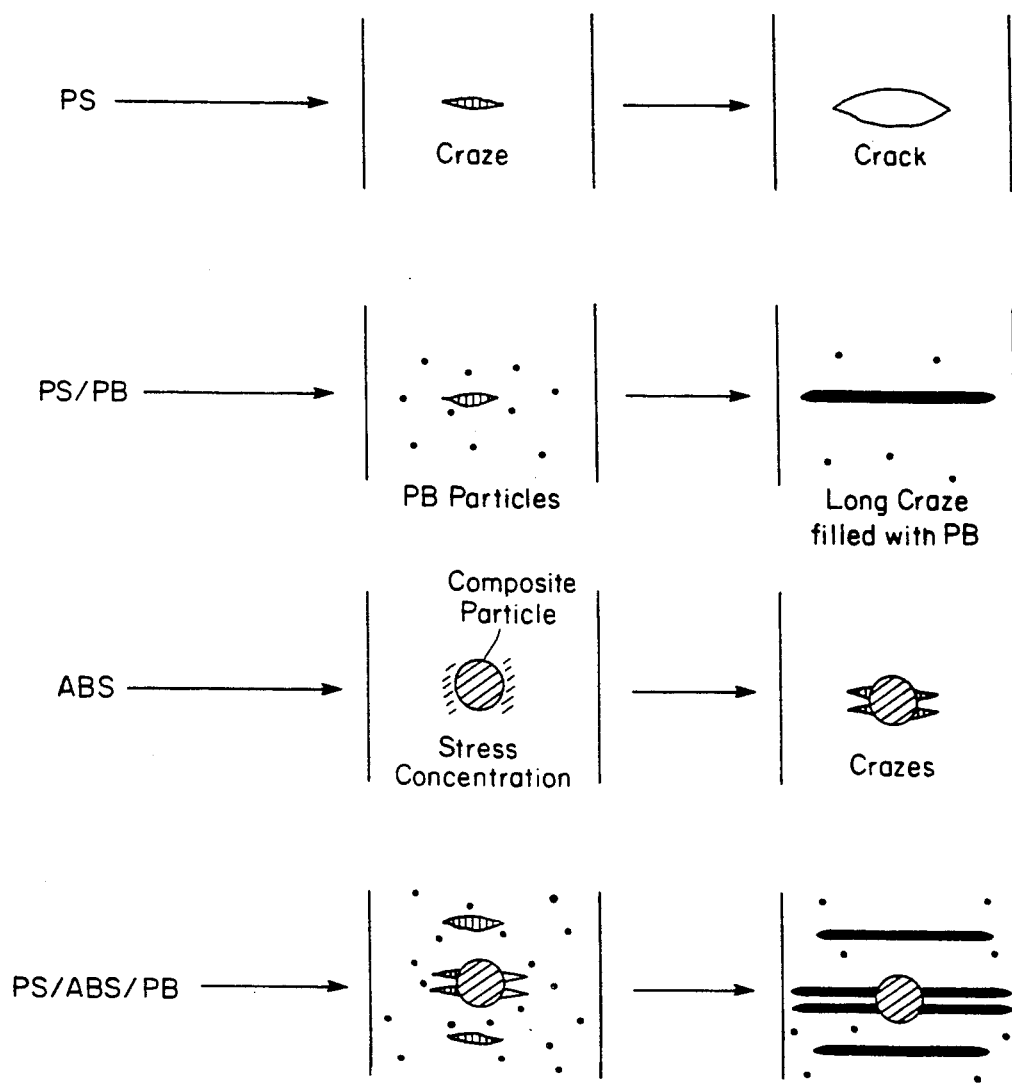

The results of the tensile tests and teh TEM observations described above are discussed in connection with the deformation mechanism up to fracture. FIG. 27 gives out a summary of the mechanism. Pure PS creates crazes which grow instantaneously from the initial deformation state, to great cracks, resulting in a brittle fracture. For liquid toughened PS, matrix PS creates crazes which are filled by nearby liquid rubber domains immediately and grow into very long crazes without becoming cracks. A whitening phenomenon happened due to existance of many of long crazes. For ABS, the equatorial zones of the dispersed rubber composites particles function as stress concentration points. From the boundary region of rubber phase and glassy matrix, a tremendous number of crazes occur, and they are also observed as a whitening phenomenon. For the ternary blends, PS/ABS/PB, both crazes imitated by the PS matrix and by the ABS particles are reinforced by nearby liquid rubber and developed quite long. There are much more crazes occurred in the PS/ABS/PB blends due to the concurrent contribution of liquid PB and ABS.

Figure 28A:
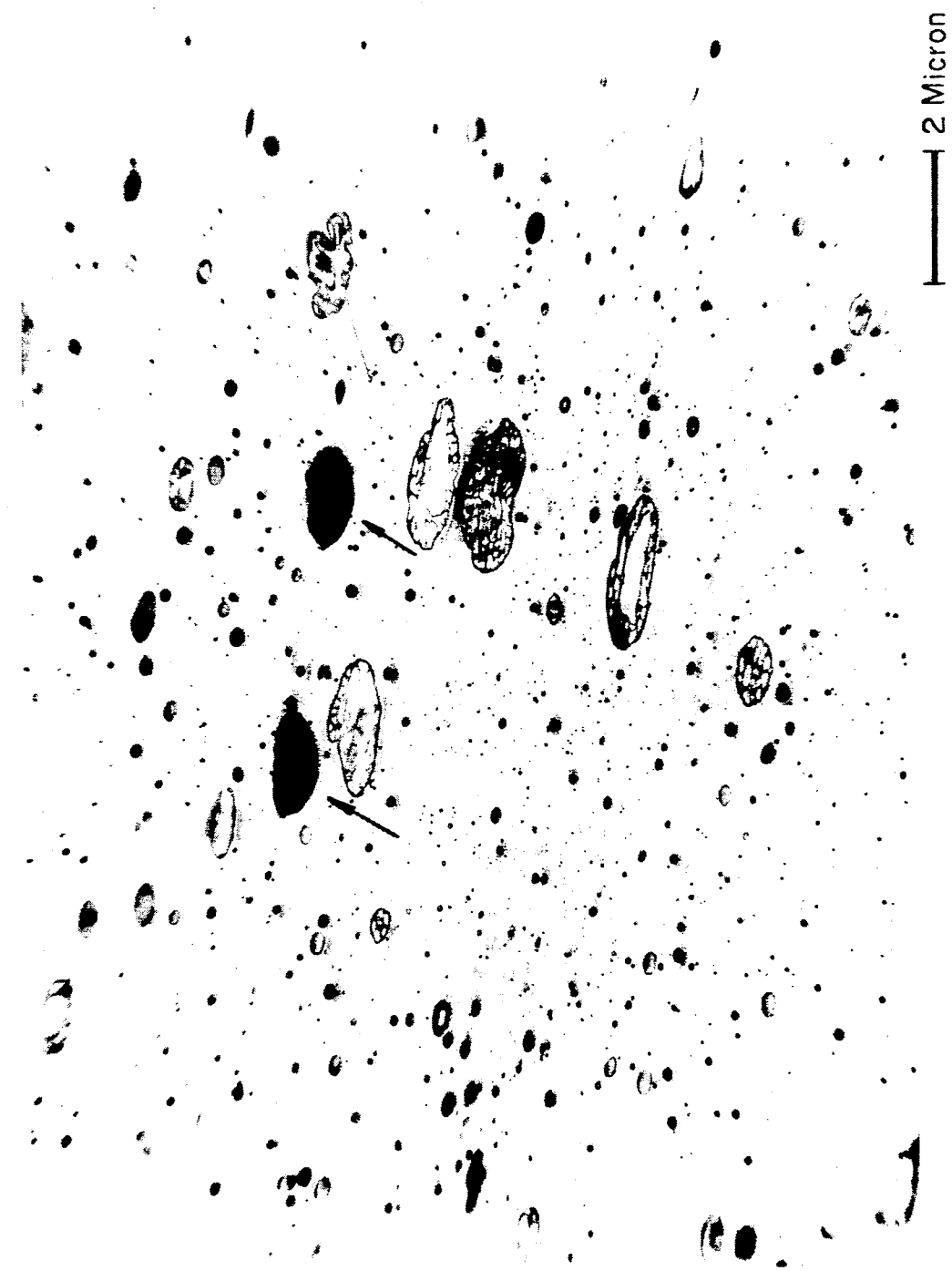
Figure 28B:

Ther is still another phenomenon found in this study. FIG. 28A and FIG. 28B show the micrographs of the PS/10%ABS/3PB blend film. In FIG. 28A, two totally black particles marked arrows appeared which looked very like pure PB particles but much larger. Higher magnification micrograph of the same sample in FIG. 28B told us that these two particles are the ABS particles covered with a thin layer of liquid PB on the surface. We never find such particles in the crazed samples. These facts can help us infer how crazes grow and be reinforced by liquid PB layer just the same as we described in the toughening medium shown in FIG. 27.

TABLE IV

Mechanical Properties of PS/PB-3000 Mw Blend Films

| PB (wt %) | Y (MPa) | f (%) | T (kJ/m2) |
|---|---|---|---|
| 0.0 | 39.5 | 0.63 | 1.58 |
| 0.5 | 34.3 | 0.79 | 1.72 |
| 0.7 | 34.0 | 1.89 | 4.90 |
| 1.0 | 34.3 | 4.09 | 8.76 |
| 1.2 | 34.3 | 3.78 | 7.97 |
| 1.5 | 32.1 | 4.72 | 9.63 |
| 2.0 | 31.4 | 7.24 | 14.44 |
| 2.5 | 29.8 | 7.87 | 14.65 |
| 3.0 | 31.4 | 9.13 | 17.05 |
| 3.5 | 23.3 | 11.97 | 16.57 |
| 4.0 | 19.7 | 13.23 | 15.37 |
| 10.0 | 12.6 | 5.67 | 4.14 |

Note:
Y is yield stress;
f is fracture strain;
T is toughness.

TABLE V

Mechanical Properties of PS/ABS Blend Films

| ABS (wt %) | Y (MPa) | f (%) | T (kJ/m2) |
|---|---|---|---|
| 0 | 39.5 | 0.63 | 1.58 |
| 5 | 38.0 | 1.57 | 3.49 |
| 10 | 34.6 | 1.63 | 3.58 |
| 20 | 30.2 | 1.79 | 3.43 |
| 30 | 29.0 | 1.26 | 2.32 |
| 100 | 30.2 | 55.10 | 64.90 |

TABLE VI

Mechanical Properties of PS/ABS/3% PB-3400 Blend Films

| ABS (wt %) | Y (MPa) | f (%) | T (kJ/m2) |
|---|---|---|---|
| PS | 39.5 | 0.6 | 1.5 |
| 0 | 24.2 | 20.8 | 21.3 |
| 2 | 23.3 | 23.6 | 29.1 |
| 5 | 23.4 | 45.7 | 48.5 |
| 7 | 27.4 | 38.1 | 52.9 |
| 10 | 27.3 | 58.6 | 72.9 |
| 20 | 31.1 | 30.9 | 46.1 |

TABLE VI-continued

Mechanical Properties of PS/ABS/3% PB-3400 Blend Films

| ABS (wt %) | Y (MPa) | f (%) | T (kJ/m2) |
|---|---|---|---|
| ABS | 20.2 | 55.1 | 64.9 |

I claim:

1. A polymer blend comprising a glassy thermoplastic polymer having a glass transition temperature greater than ambient room temperature and between about 0.1 and 4.0 weight percent of a rubbery polymer or copolymer obtained from a diolefin compound wherein said rubbery polymer is interspersed as pools having a size between about 200 and 1000 Angstroms within said glassy thermoplastic polymer.

2. The polymer blend of claim 1 wherein the concentration of the rubbery polymer is between about 0.5 and 0.1 weight percent.

3. The polymer blend of claim 1 which includes between about 0.5 and 1.0 weight percent of a low molecular weight glassy polymer having a molecular weight less than about 3000 Kg/mole.

4. The polymer blend of claim 2 which includes between about 0.5 and 1.0 weight percent of a low molecular weight glassy polymer having a molecular weight less than about 3000 Kg/mole.

5. The blend of any one of claims 1, 2, 3 or 4 wherein the glassy thermoplastic polymer is polystyrene.

6. The blend of any one of claims 1, 2, 3 or 4 wherein the rubbery polymer is polybutadiene.

* * * * *